US012750840B2

(12) United States Patent
Zhang

(10) Patent No.: US 12,750,840 B2
(45) Date of Patent: Sep. 29, 2026

(54) SEMI-PERSISTENT SCHEDULING METHOD, USER EQUIPMENT, BASE STATION, AND COMMUNICATION SYSTEM

(71) Applicant: HONOR DEVICE CO., LTD., Shenzhen (CN)

(72) Inventor: Jian Zhang, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 189 days.

(21) Appl. No.: 18/721,130

(22) PCT Filed: Dec. 27, 2022

(86) PCT No.: PCT/CN2022/142201

§ 371 (c)(1),
(2) Date: Jun. 17, 2024

(87) PCT Pub. No.: WO2023/165235

PCT Pub. Date: Sep. 7, 2023

(65) Prior Publication Data

US 2025/0056522 A1 Feb. 13, 2025

(30) Foreign Application Priority Data

Mar. 2, 2022 (CN) ......................... 202210203612.5

(51) Int. Cl.
*H04W 72/11* (2023.01)
*H04W 72/0453* (2023.01)

(52) U.S. Cl.
CPC ........ *H04W 72/11* (2023.01); *H04W 72/0453* (2013.01)

(58) Field of Classification Search
None
See application file for complete search history.

(56) References Cited

U.S. PATENT DOCUMENTS

| | | | |
|---|---|---|---|
| 10,973,045 | B2 | 4/2021 | Xiao et al. |
| 11,337,239 | B2 | 5/2022 | Lee et al. |

(Continued)

FOREIGN PATENT DOCUMENTS

| | | | |
|---|---|---|---|
| CN | 103959879 | A | 7/2014 |
| CN | 107734543 | A | 2/2018 |

(Continued)

OTHER PUBLICATIONS

Huawei, HiSilicon, "SPS enhancement for V2V", 3GPP TSG RAN WG1 Meeting #84bis, R1-162122, Busan, Korea, Apr. 11-15, 2016, total 6 pages.

(Continued)

*Primary Examiner* — Hong S Cho
(74) *Attorney, Agent, or Firm* — WOMBLE BOND DICKINSON (US) LLP

(57) ABSTRACT

This application provides a semi-persistent scheduling method, a user equipment, a base station, and a communication system. In the method, a user equipment receives first configuration information and second configuration information that are sent by a base station. The first configuration information includes an SPS resource configuration pool including one or more pieces of SPS resource configuration information and an index number corresponding to each piece of SPS resource configuration information. The second configuration information indicates at least one index number in the SPS resource configuration pool and a sequence of the at least one index number.

17 Claims, 15 Drawing Sheets

(56) References Cited

U.S. PATENT DOCUMENTS

| | | | | |
|---|---|---|---|---|
| 11,477,815 | B2 * | 10/2022 | Lyu | H04L 5/0094 |
| 11,882,571 | B2 | 1/2024 | Bae et al. | |
| 12,150,145 | B2 * | 11/2024 | Ying | H04W 72/23 |
| 12,238,712 | B2 | 2/2025 | Ying et al. | |
| 2014/0112304 | A1 | 4/2014 | Shimizu et al. | |
| 2017/0041828 | A1 | 2/2017 | Zhang | |
| 2018/0049229 | A1 | 2/2018 | Dinan et al. | |
| 2019/0174522 | A1 | 6/2019 | Xiao et al. | |
| 2020/0022150 | A1 | 1/2020 | Yu et al. | |
| 2020/0068595 | A1 | 2/2020 | Dinan et al. | |
| 2020/0214084 | A1 | 7/2020 | Panteleev et al. | |
| 2021/0234663 | A1 | 7/2021 | Kim et al. | |
| 2021/0235493 | A1 | 7/2021 | Wu et al. | |

FOREIGN PATENT DOCUMENTS

| | | | |
|---|---|---|---|
| CN | 109076590 | A | 12/2018 |
| CN | 110603880 | A | 12/2019 |
| CN | 110710313 | A | 1/2020 |
| CN | 111050404 | A | 4/2020 |
| CN | 114128380 | A | 3/2022 |
| EP | 4124142 | A1 | 1/2023 |
| EP | 4429367 | A1 | 9/2024 |
| WO | 2018027926 | A1 | 2/2018 |
| WO | 2021066117 | A1 | 4/2021 |
| WO | 2021221431 | A1 | 11/2021 |

OTHER PUBLICATIONS

Huawei, HiSilicon, “Discussion on the impact of DL SPS enhancement”, 3GPP TSG-RAN WG2 Meeting 105bis, R2-1904312, Xi’an, China, Apr. 8-12, 2019, total 3 pages.

* cited by examiner

SEMI-PERSISTENT SCHEDULING METHOD, USER EQUIPMENT, BASE STATION, AND COMMUNICATION SYSTEM

CROSS-REFERENCE TO RELATED APPLICATIONS

This application is a national stage of International Application No. PCT/CN2022/142201, filed on Dec. 27, 2022, which claims priority to Chinese Patent Application No. 202210203612.5, filed on Mar. 2, 2022. The disclosures of both of the aforementioned applications are hereby incorporated by reference in their entireties.

TECHNICAL FIELD

This application relates to the field of communication technologies, and in particular, to a semi-persistent scheduling method, a user equipment, a base station, and a communication system.

BACKGROUND

Semi-persistent scheduling (Semi-Persistent Scheduling, SPS) is also referred to as semi-static scheduling or semi-permanent scheduling. Dynamic scheduling may mean that a base station (gNB) allocates a radio resource (on a physical downlink control channel (Physical Downlink Control Channel, PDCCH)) to a user equipment (User Equipment, UE) once at each scheduling periodicity (for example, a TTI). Different from dynamic scheduling, SPS allows semi-persistent configuration of a radio resource and periodic allocation of the configured resource to a specific UE, that is, has a feature of one allocation and multiple use. Therefore, a gNB does not need to configure a radio resource for the UE at each TTI, so that PDCCH overheads are reduced. Therefore, SPS can be well adapted to services with a feature of periodicity, such as an extended reality (eXtended Reality, XR) service.

However, currently, time-frequency resource configuration information corresponding to an SPS resource is fixed, in other words, a size of an SPS resource invoked at each TTI is fixed, but a size of a data frame that is of the XR service and transmitted at each periodicity is different. Consequently, there is a mismatch problem between the SPS resource and the data frame of the XR service. Mismatch between the SPS resource and the data frame of the XR service may result in a waste of resources such as power consumption of the UE and a system capacity of the base station.

SUMMARY

To resolve the foregoing technical problems, this application provides a semi-persistent scheduling method, a user equipment, a base station, and a communication system, to enable resource allocation of semi-persistent scheduling to match diversified requirements for radio resources of a service having a feature of periodicity, reduce power consumption of the user equipment, and avoid reducing a system capacity of the base station.

According to a first aspect, this application provides a semi-persistent scheduling method. The method is applied to a user equipment, and includes: receiving first configuration information from a base station, where the first configuration information includes a semi-persistent scheduling SPS resource configuration pool, and the SPS resource configuration pool includes one or more pieces of SPS resource configuration information and an index number corresponding to each piece of SPS resource configuration information; receiving second configuration information from the base station, where the second configuration information indicates at least one index number in the SPS resource configuration pool and a sequence of the at least one index number; determining SPS resource configuration information corresponding to the at least one index number based on the first configuration information and the second configuration information; receiving, by sequentially using an SPS resource corresponding to the SPS resource configuration information corresponding to the at least one index number according to the sequence, data scheduled by the base station on the SPS resource; and after receiving data by using an SPS resource corresponding to SPS resource configuration information corresponding to a last index number in the at least one index number, receiving, by repeatedly and sequentially using the SPS resource corresponding to the SPS resource configuration information corresponding to the at least one index number according to the sequence, data scheduled by the base station on the SPS resource. In this way, the user equipment can receive, by repeatedly using the SPS resource corresponding to the SPS resource configuration information corresponding to the at least one index number according to the sequence indicated by the second configuration information, the data scheduled by the base station on the SPS resource, so that an SPS resource matches a data frame of an XR service, and therefore power consumption of the user equipment is reduced and reduction of a system capacity of the base station can be avoided.

According to the first aspect, the second configuration information is carried in downlink control information DCI.

According to the first aspect or any one of the foregoing implementations of the first aspect, the SPS resource configuration information includes SPS frequency domain resource configuration information; and the second configuration information is carried in a frequency domain resource assignment FDRA field in the DCI.

According to the first aspect or any one of the foregoing implementations of the first aspect, the SPS resource configuration information includes SPS time domain resource configuration information; and the second configuration information is carried in a time domain resource assignment TDRA field in the DCI.

According to the first aspect or any one of the foregoing implementations of the first aspect, the SPS resource configuration information includes SPS modulation and coding scheme resource configuration information; and the second configuration information is carried in a modulation and coding scheme MCS field in the DCI.

According to the first aspect or any one of the foregoing implementations of the first aspect, the SPS resource configuration pool further includes common SPS resource configuration information; and the common SPS resource configuration information includes at least one piece of or a plurality of pieces of SPS time-frequency resource configuration information. In this way, through introduction of the common SPS resource configuration information, SPS resources corresponding to common SPS resource configuration information of different sizes can be selected based on SPS resources corresponding to SPS resource configuration information, to further implement scheduling of SPS resources of different sizes, and better adapt to diversified requirements for radio resources of a service having a feature of periodicity.

According to the first aspect or any one of the foregoing implementations of the first aspect, the method further includes: receiving enabling information from the base station, where the enabling information indicates the user equipment to detect, at each SPS scheduling periodicity, whether there is a demodulation reference signal DMRS of the user equipment in an SPS resource corresponding to the common SPS resource configuration information. In this way, use of the SPS resource corresponding to the common SPS resource configuration information can be dynamically implemented with the enabling information.

According to the first aspect or any one of the foregoing implementations of the first aspect, after the receiving enabling information from the base station, the method further includes: detecting, at each SPS scheduling periodicity, whether there is the DMRS of the user equipment in the SPS resource corresponding to the common SPS resource configuration information; and when finding, at each SPS scheduling periodicity, that there is the DMRS of the user equipment in the SPS resource corresponding to the common SPS resource configuration information, receiving data scheduled by the base station on the SPS resource corresponding to the common SPS resource configuration information.

According to the first aspect or any one of the foregoing implementations of the first aspect, third configuration information is sent to the base station, where the third configuration information indicates at least one index number in the SPS resource configuration pool and a sequence of the at least one index number; and data is sent to the base station by sequentially using an SPS resource corresponding to SPS resource configuration information corresponding to the at least one index number according to the sequence. In this way, the base station can receive, by repeatedly using the SPS resource corresponding to the SPS resource configuration information corresponding to the at least one index number according to the sequence indicated by the third configuration information, data scheduled by the user equipment on the SPS resource, so that an SPS resource matches a data frame of an XR service, and therefore the power consumption of the user equipment is reduced and the reduction of the system capacity of the base station can be avoided.

According to the first aspect or any one of the foregoing implementations of the first aspect, the third configuration information is carried in configured grant uplink control information CG-UCI.

According to the first aspect or any one of the foregoing implementations of the first aspect, when the SPS resource configuration information includes the SPS frequency domain resource configuration information, the third configuration information is carried in a frequency domain resource assignment field in the CG-UCI. Alternatively, when the SPS resource configuration information includes the SPS time domain resource configuration information, the third configuration information is carried in a time domain resource assignment field in the CG-UCI. Alternatively, when the SPS resource configuration information includes the SPS modulation and coding scheme resource configuration information, the third configuration information is carried in a modulation configuration coding field in the CG-UCI. Alternatively, when the SPS resource configuration information includes the SPS time-frequency resource configuration information, the third configuration information is carried in a time-frequency resource configuration field in the CG-UCI.

According to a second aspect, this application provides a semi-persistent scheduling method. The method is applied to a base station, and includes: sending first configuration information to a user equipment, where the first configuration information includes a semi-persistent scheduling SPS resource configuration pool, and the SPS resource configuration pool includes one or more pieces of SPS resource configuration information and an index number corresponding to each piece of SPS resource configuration information; and sending second configuration information to the user equipment, where the second configuration information indicates at least one index number in the SPS resource configuration pool and a sequence of the at least one index number.

According to the second aspect, the SPS resource configuration pool further includes common SPS resource configuration information; and the common SPS resource configuration information includes at least one piece of or a plurality of pieces of SPS time-frequency resource configuration information.

According to the second aspect or any one of the foregoing implementations of the second aspect, the method further includes: sending enabling information to the user equipment, where the enabling information indicates the user equipment to detect, at each SPS scheduling periodicity, whether there is a demodulation reference signal DMRS of the user equipment in an SPS resource corresponding to the common SPS resource configuration information.

According to the second aspect or any one of the foregoing implementations of the second aspect, after the sending enabling information to the user equipment, the method further includes: adding the DMRS of the user equipment to the SPS resource corresponding to the common SPS resource configuration information.

According to the second aspect or any one of the foregoing implementations of the second aspect, the method further includes: receiving third configuration information from the user equipment, where the third configuration information indicates at least one index number in the SPS resource configuration pool and a sequence of the at least one index number; determining SPS resource configuration information corresponding to the at least one index number based on the first configuration information and the third configuration information; receiving, by sequentially using an SPS resource corresponding to the SPS resource configuration information corresponding to the at least one index number according to the sequence, data scheduled by the user equipment on the SPS resource; and after receiving data by using an SPS resource corresponding to SPS resource configuration information corresponding to a last index number in the at least one index number, receiving, by repeatedly and sequentially using the SPS resource corresponding to the SPS resource configuration information corresponding to the at least one index number according to the sequence, data scheduled by the user equipment on the SPS resource.

The second aspect and any one of the implementations of the second aspect correspond to the first aspect and any one of the implementations of the first aspect respectively. For technical effects corresponding to the second aspect and any one of the implementations of the second aspect, refer to the technical effects corresponding to the first aspect and any one of the implementations of the first aspect. Details are not described herein again.

According to a third aspect, this application provides a semi-persistent scheduling method. The method is applied to a user equipment, and includes: receiving fourth configuration information from a base station, where the fourth configuration information includes a semi-persistent scheduling SPS resource configuration pool, and the SPS resource configuration pool includes one or more pieces of SPS resource configuration information and an index number corresponding to each piece of SPS resource configuration information; receiving fifth configuration information from the base station, where the fifth configuration information includes an SPS resource activation pool, the SPS resource activation pool includes one or more SPS resource configuration queues and an index number corresponding to each SPS resource configuration queue, and each SPS resource configuration queue indicates at least one index number in the SPS resource configuration pool and a sequence of the at least one index number; receiving sixth configuration information from the base station, where the sixth configuration information indicates an index number corresponding to one SPS resource configuration queue in the SPS resource activation pool; determining SPS resource configuration information corresponding to the at least one index number based on the fourth configuration information, the fifth configuration information, and the sixth configuration information; receiving, by sequentially using an SPS resource corresponding to the SPS resource configuration information corresponding to the at least one index number according to the sequence, data scheduled by the base station on the SPS resource; and after receiving data by using an SPS resource corresponding to SPS resource configuration information corresponding to a last index number in the at least one index number, receiving, by repeatedly and sequentially using the SPS resource corresponding to the SPS resource configuration information corresponding to the at least one index number according to the sequence, data scheduled by the base station on the SPS resource. In this way, through introduction of the SPS resource activation pool, at least one index number and a sequence of the at least one index number in the SPS resource configuration pool are configured into an SPS resource configuration queue in the SPS resource activation pool, so that the at least one index number and the sequence of the at least one index number in the SPS resource configuration pool can be determined based on an index number of the SPS resource configuration queue. Therefore, this is applicable to more service scenarios.

In addition, when the user equipment receives both the fourth configuration information and the fifth configuration information, content indicated by the sixth configuration information sent by the base station may be an index number corresponding to one SPS resource configuration queue in the SPS resource activation pool, so that cyclic use at more SPS periodicities can be implemented by using a same field. Therefore, this is applicable to more service scenarios.

According to the third aspect, the determining SPS resource configuration information corresponding to the at least one index number based on the fourth configuration information, the fifth configuration information, and the sixth configuration information includes: determining, based on the fifth configuration information and the sixth configuration information, the SPS resource configuration queue that is in the SPS resource activation pool and corresponds to the index number indicated by the sixth configuration information; and determining the SPS resource configuration information corresponding to the at least one index number based on the fourth configuration information and the determined SPS resource configuration queue.

According to the third aspect, the sixth configuration information is carried in downlink control information DCI.

According to the third aspect or any one of the foregoing implementations of the third aspect, the SPS resource configuration information includes SPS frequency domain resource configuration information; and the sixth configuration information is carried in a frequency domain resource assignment FDRA field in the DCI.

According to the third aspect or any one of the foregoing implementations of the third aspect, the SPS resource configuration information includes SPS time domain resource configuration information; and the sixth configuration information is carried in a time domain resource assignment TDRA field in the DCI.

According to the third aspect or any one of the foregoing implementations of the third aspect, the SPS resource configuration information includes SPS modulation and coding scheme resource configuration information; and the sixth configuration information is carried in a modulation and coding scheme MCS field in the DCI.

According to the third aspect or any one of the foregoing implementations of the third aspect, the SPS resource configuration pool further includes common SPS resource configuration information; and the common SPS resource configuration information includes at least one piece of or a plurality of pieces of SPS time-frequency resource configuration information. In this way, through introduction of the common SPS resource configuration information, SPS resources corresponding to common SPS resource configuration information of different sizes can be selected based on SPS resources corresponding to SPS resource configuration information, to further implement scheduling of SPS resources of different sizes, and better adapt to diversified requirements for radio resources of a service having a feature of periodicity.

According to the third aspect or any one of the foregoing implementations of the third aspect, the method further includes: receiving enabling information from the base station, where the enabling information indicates the user equipment to detect, at each SPS scheduling periodicity, whether there is a demodulation reference signal DMRS of the user equipment in an SPS resource corresponding to the common SPS resource configuration information. In this way, use of the SPS resource corresponding to the common SPS resource configuration information can be dynamically implemented with the enabling information.

According to the third aspect or any one of the foregoing implementations of the third aspect, after the receiving enabling information from the base station, the method further includes: detecting, at each SPS scheduling periodicity, whether there is the DMRS of the user equipment in the SPS resource corresponding to the common SPS resource configuration information; and when finding, at each SPS scheduling periodicity, that there is the DMRS of the user equipment in the SPS resource corresponding to the common SPS resource configuration information, receiving data scheduled by the base station on the SPS resource corresponding to the common SPS resource configuration information.

According to the third aspect or any one of the foregoing implementations of the third aspect, seventh configuration information is sent to the base station, where the seventh configuration information indicates at least one index number in the SPS resource configuration pool and a sequence of the at least one index number; and data is sent to the base station by sequentially using an SPS resource corresponding to SPS resource configuration information corresponding to the at least one index number according to the sequence. In this way, the base station can receive, by repeatedly using the SPS resource corresponding to the SPS resource configuration information corresponding to the at least one index number according to the sequence indicated by the seventh configuration information, data scheduled by the user equipment on the SPS resource, so that an SPS resource matches a data frame of an XR service, and therefore power consumption of the user equipment is reduced and reduction of a system capacity of the base station can be avoided.

According to the third aspect or any one of the foregoing implementations of the third aspect, the seventh configuration information is carried in configured grant uplink control information CG-UCI.

According to the third aspect or any one of the foregoing implementations of the third aspect, when the SPS resource configuration information includes the SPS frequency domain resource configuration information, the seventh configuration information is carried in a frequency domain resource assignment field in the CG-UCI. Alternatively, when the SPS resource configuration information includes the SPS time domain resource configuration information, the seventh configuration information is carried in a time domain resource assignment field in the CG-UCI. Alternatively, when the SPS resource configuration information includes the SPS modulation and coding scheme resource configuration information, the seventh configuration information is carried in a modulation configuration coding field in the CG-UCI. Alternatively, when the SPS resource configuration information includes the SPS time-frequency resource configuration information, the seventh configuration information is carried in a time-frequency resource configuration field in the CG-UCI.

According to a fourth aspect, this application provides a semi-persistent scheduling method. The method is applied to a base station, and includes: sending fourth configuration information to a user equipment, where the fourth configuration information includes a semi-persistent scheduling SPS resource configuration pool, and the SPS resource configuration pool includes one or more pieces of SPS resource configuration information and an index number corresponding to each piece of SPS resource configuration information; sending fifth configuration information to the user equipment, where the fifth configuration information includes an SPS resource activation pool, the SPS resource activation pool includes one or more SPS resource configuration queues and an index number corresponding to each SPS resource configuration queue, and each SPS resource configuration queue indicates at least one index number in the SPS resource configuration pool and a sequence of the at least one index number; and sending sixth configuration information to the user equipment, where the sixth configuration information indicates an index number corresponding to one SPS resource configuration queue in the SPS resource activation pool.

According to the fourth aspect, the SPS resource configuration pool further includes common SPS resource configuration information; and the common SPS resource configuration information includes at least one piece of or a plurality of pieces of SPS time-frequency resource configuration information.

According to the fourth aspect or any one of the foregoing implementations of the fourth aspect, the method further includes: sending enabling information to the user equipment, where the enabling information indicates the user equipment to detect, at each SPS scheduling periodicity, whether there is a demodulation reference signal DMRS of the user equipment in an SPS resource corresponding to the common SPS resource configuration information.

According to the fourth aspect or any one of the foregoing implementations of the fourth aspect, after the sending enabling information to the user equipment, the method further includes: adding the DMRS of the user equipment to the SPS resource corresponding to the common SPS resource configuration information.

According to the fourth aspect or any one of the foregoing implementations of the fourth aspect, the method further includes: receiving seventh configuration information from the user equipment, where the seventh configuration information indicates at least one index number in the SPS resource configuration pool and a sequence of the at least one index number; determining SPS resource configuration information corresponding to the at least one index number based on the first configuration information and the seventh configuration information; receiving, by sequentially using an SPS resource corresponding to the SPS resource configuration information corresponding to the at least one index number according to the sequence, data scheduled by the user equipment on the SPS resource; and after receiving data by using an SPS resource corresponding to SPS resource configuration information corresponding to a last index number in the at least one index number, receiving, by repeatedly and sequentially using the SPS resource corresponding to the SPS resource configuration information corresponding to the at least one index number according to the sequence, data scheduled by the user equipment on the SPS resource.

The fourth aspect and any one of the implementations of the fourth aspect correspond to the third aspect and any one of the implementations of the third aspect respectively. For technical effects corresponding to the fourth aspect and any one of the implementations of the fourth aspect, refer to the technical effects corresponding to the third aspect and any one of the implementations of the third aspect. Details are not described herein again.

According to a fifth aspect, this application provides a user equipment, configured to: perform the semi-persistent scheduling method according to any one of the first aspect or the implementations of the first aspect; or perform the semi-persistent scheduling method according to any one of the third aspect or the implementations of the third aspect.

According to a sixth aspect, the application provides a base station, configured to: perform the semi-persistent scheduling method according to any one of the second aspect or the implementations of the second aspect; or perform the semi-persistent scheduling method according to any one of the fourth aspect or the implementations of the fourth aspect.

According to a seventh aspect, the application provides a communication system. The system includes the user equipment according to the fifth aspect and the base station according to the sixth aspect.

DESCRIPTION OF EMBODIMENTS

Figure 1:
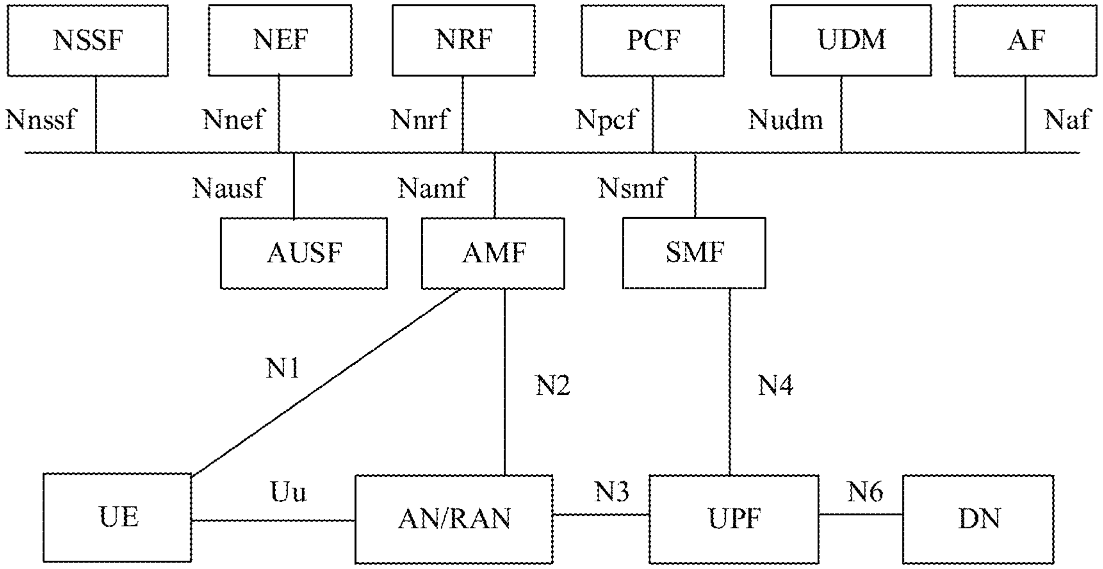
FIG. 1 shows an example of a communication network architecture.

The following clearly and completely describes technical solutions in embodiments of this application with reference to accompanying drawings in embodiments of this application. Clearly, the described embodiments are merely some but not all of embodiments of this application. All other embodiments obtained by a person of ordinary skill in the art based on embodiments of this application without creative efforts shall fall within the protection scope of this application.

The term “and/or” in this specification describes only an association relationship for describing associated objects and represents that three relationships may exist. For example, A and/or B may represent the following three cases: Only A exists, both A and B exist, and only B exists.

In the specification and claims in embodiments of this application, terms “first”, “second”, and the like are intended to distinguish between different objects but do not indicate a particular order of the objects. For example, a first target object and a second target object are intended to distinguish between different target objects, but do not indicate a particular order of the target objects.

In embodiments of this application, the term such as “example” or “for example” is used to represent giving an example, an illustration, or a description. Any embodiment or design scheme described with “example” or “for example” in embodiments of this application should not be explained as being more preferred or having more advantages than another embodiment or design scheme. Exactly, use of the term such as “example” or “for example” is intended to present a relative concept in a specific manner.

In descriptions in embodiments of this application, unless otherwise specified, “a plurality of” means two or more than two. For example, a plurality of processing units refer to two or more processing units; and a plurality of systems refer to two or more systems.

Before the technical solutions of embodiments of this application are described, a communication system to which embodiments of this application are applicable is first described by using examples.

For example, embodiments of this application are applicable to, but not limited to, the following communication systems: a narrow band-internet of things (Narrow Band-Internet Of Things, NB-IoT) system, a wireless local area network (Wireless Local Access Network, WLAN) system, a long term evolution (Long Term Evolution, LTE) system, a vehicle wireless communication (vehicle to X, V2X) system, a 5th generation mobile communication (5th Generation Mobile Networks Or 5th Generation Wireless Systems, 5G) system that is also referred to as a new radio (New Radio, NR) system, communication systems after 5G such as a 6G system, a device to device (Device To Device, D2D) communication system, or the like.

To facilitate understanding of a communication network architecture of the communication system described above, the communication network architecture of the communication system to which embodiments of this application are applicable is described below with reference to FIG. 1.

For example, FIG. 1 shows an interaction relationship between network functions and entities and corresponding interfaces by using a network service architecture of a 5G system as an example, and network functions and entities included in a service-based network architecture (Service-Based Architecture, SBA) of the 5G system in the 3rd generation partnership project (The 3rd Generation Partnership Project, 3GPP) mainly include: a user equipment (User Equipment, UE), an access network (Access Network, AN) or radio access network (Radio Access Network, RAN), a user plane function (User Plane Function, UPF), a data network (Data Network, DN), an access management function (Access Management Function, AMF), a session management function SMF, an authentication server function (Authentication Server Function, AUSF), a policy control function (Policy Control Function, PCF), an application function (Application Function, AF), a network slice selection function (Network Slice Selection Function, NSSF), a unified data management (Unified Data Management, UDM), a network exposure function (Network Exposure Function, NEF), and a network repository function (Network Repository Function, NRF).

The UE, the AN/RAN, the UPF, and the DN are generally referred to as user plane network functions and entities (or user plane network elements), and the remaining parts are generally referred to as control plane network functions and entities (or control plane network elements). Processing functions of the control plane network elements in a network are defined in 3GPP. The control plane network elements have functional behaviors defined in 3GPP and interfaces defined in 3GPP. A network function can be used as a network element running on dedicated hardware, or a software instance running on dedicated hardware, or a virtual function instantiated on an appropriate platform, for example, implemented on cloud infrastructure.

Main functions of the network elements are described below in detail.

AN/RAN: The AN/RAN may be various forms of base stations, for example, a macro base station, a micro base station (also referred to as a “small cell”), a distributed unit-control unit (Distribute Unit-Control Unit, DU-CU), and the like. In addition, the base station may alternatively be a wireless controller in a cloud radio access network (Cloud Radio Access Network, CRAN) scenario, a relay station, an access point, a vehicle-mounted device, a wearable device, a network device in a future evolved public land mobile network (Public Land Mobile Network, PLMN), or the like. The AN/RAN may alternatively be a broadband network service gateway (Broadband Network Gateway, BNG), a convergence switch, a non-3GPP access device, or the like. The AN/RAN is mainly responsible for functions such as radio resource management on an air interface side, uplink and downlink data classification, quality of service (Quality of Service, QoS) management, data compression and encryption, and completion of signaling processing with a control plane network element or completion of data forwarding with a user plane function network element. A specific form and a structure of the AN/RAN are not limited in embodiments of this application. For example, in systems using different radio access technologies, names of devices having base station functions may be different. For example, the base station may be an evolved universal terrestrial radio access network (Evolved Universal Terrestrial Radio Access Network, E-UTRAN) device such as an evolved NodeB (evolutional NodeB, eNB or e-NodeB) in LTE, or may be a next generation radio access network (Next Generation Radio Access Network, NG-RAN) device (such as a gNB) in a 5G system.

UPF: The UPF is mainly responsible for packet routing and forwarding, QoS processing of user plane data, charging information statistics collection, and the like. A transmission resource and a scheduling function in the UPF that are for providing a service to the UE are managed and controlled by the SMF.

DN: The DN is a network used for data transmission. For example, the DN may be an operator service network, internet access, or a third-party service network.

AMF: The AMF is mainly responsible for processing of control plane messages, for example, access control, mobility management, lawful interception, and access authentication/authorization. Specifically, functions of the AMF are mainly: (1) processing of an access network control plane; (2) processing of NAS messages, including NAS ciphering and integrity protection; (3) registration management; (4) connection management; (5) reachability management; (6) mobility management; (7) lawful information interception; (8) provision of session management messages between the UE and the SMF; (9) implementation of transparent transmission for routing session management (SM) messages, like a transparent proxy; (10) access authentication; (11) access authorization; (12) forwarding of SMS messages (short messaging service messages) between the UE and a short messaging service function SMSF; (13) interaction with the AUSF and the UE to obtain a UE authentication intermediate key; and (14) calculation of a specific key of an access network.

SMF: The SMF is mainly used for session management, internet protocol (Internet Protocol, IP) address assignment and management of the UE, selection of a manageable user plane function, a termination point of a policy control and charging function interface, downlink data notification, and the like.

PCF: The PCF is mainly used for providing parameters related to a UE policy rule, an AM policy rule, and an SM policy rule to the UE, the AMF, and the SMF respectively, managing user subscription information, joining to the UDM to access subscriber information related to policy decisions, and so on.

NRF: The NRF is mainly used for providing internal/external addressing functions, receiving query requests from other network elements to specific types of network elements and returning information about related network elements, and so on.

AUSF: The AUSF is mainly responsible for network security, and is used for generating a key, implementing mutual authentication of the UE, and supporting a unified authentication framework.

AF: The AF is used for providing services, and is mainly used for: (1) implementing application influence on traffic routing; (2) accessing network capability exposure; and (3) interacting with a policy framework for policy control.

NSSF: The NSSF is mainly used for selecting and managing a network slice instance (Network Slice Instance, NSI), determining a mapping between allowed network slice information and used network slice information, and determining a mapping between configured network slice information and subscribed network slice information.

NEF: The NEF is an interface network element used for mutual information exchange between internal and external entities in a network, is also a logical unit used for internal information distribution and aggregation, and mainly includes three capabilities: a monitoring capability, a provisioning capability, and a policy/charging capability.

UDM: The UDM includes two parts, where one part is an application front end (FE), and the other part is a user data repository (UDR).

To-be-transmitted data may be transmitted over a PDU session (namely, a communication bearer described in the specification) established between the UE and the DN through two network function entities the (R)AN and the UPF, and the UE and the (R)AN communicates with each other by using a specific air interface technology. N1 is an interface between the UE and the AMF, N2 is an interface between the (R)AN and the AMF, N3 is an interface between the (R)AN and the UPF, N4 is an interface between the SMF and the UPF, and N6 is an interface between the UPF and the DN. Namf is a service-based interface exhibited by the AMF, Nsmf is a service-based interface exhibited by the SMF, Nausf is a service-based interface exhibited by the AUSF, Nnssf is a service-based interface exhibited by the NSSF, Nnef is a service-based interface exhibited by the NEF, Nnrf is a service-based interface exhibited by the NRF, Npcf is a service-based interface exhibited by the PCF, Nudm is a service-based interface exhibited by the UDM, and Naf is a service-based interface exhibited by the AF.

For introduction of functions and the like of network elements such as the UPF, the DN, the AUSF, the NSSF, the NEF, the NRF, and the UDM, refer to explanations and descriptions in a conventional technology. Details are not described herein.

In addition, it should be noted that, terms such as “system” and “network” used in embodiments of this application may be used interchangeably.

In addition, in embodiments of this application, the UE may be a desktop device, a laptop device, a handheld device, a wearable device, a smart home device, a computing device, or the like with a wireless connection function, for example, a netbook, a tablet computer, or an AR/VR device. The devices are not listed one by one herein.

In addition, a specific type, structure, and the like of the UE are not limited in embodiments of this application.

Figure 2:
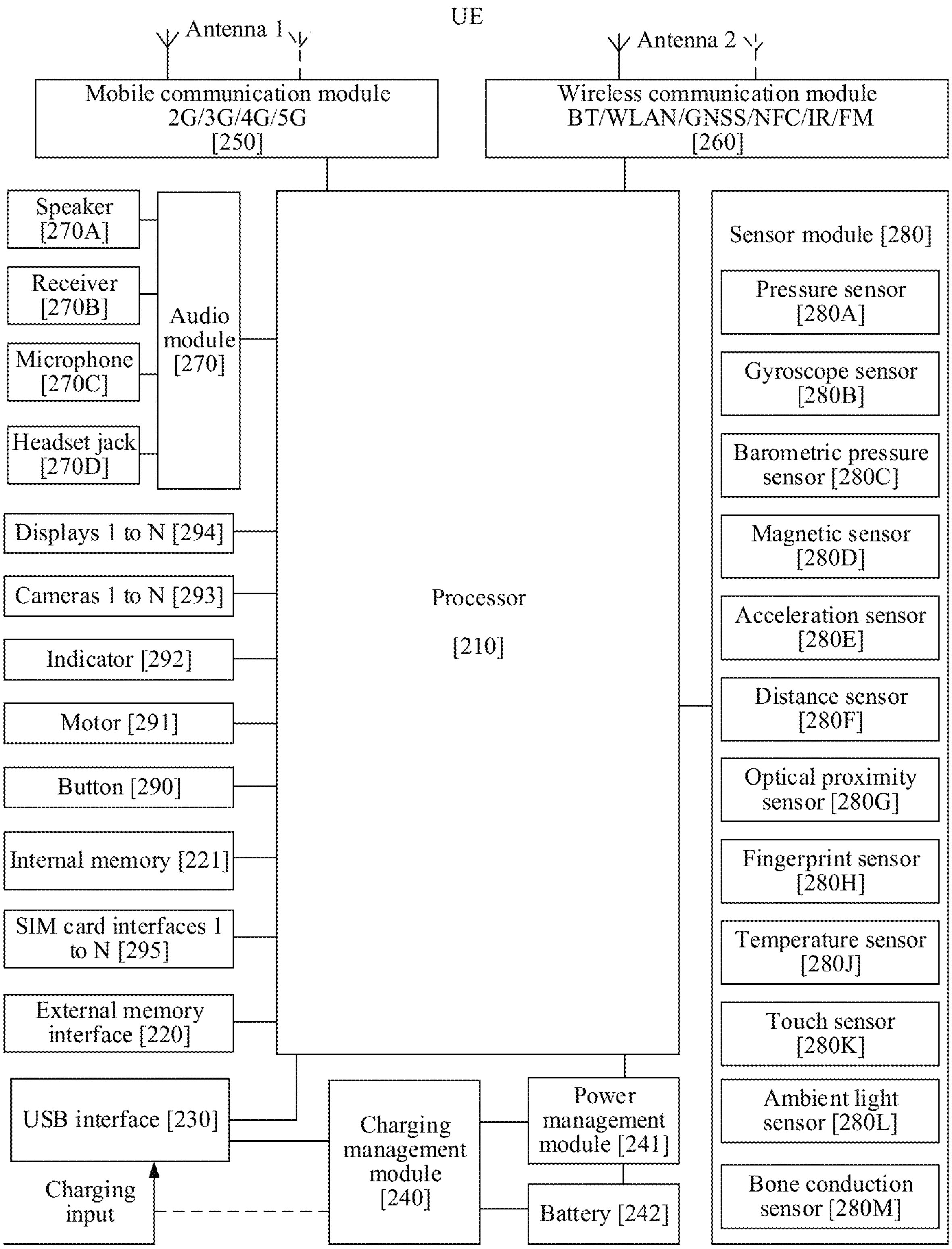
FIG. 2 is a diagram of an example of a hardware structure of a user equipment.

To facilitate understanding of the UE in the technical solutions provided in embodiments of this application, the following describes a hardware structure of the UE with reference to FIG. 2.

For example, in some embodiments, the structure of the UE may be shown in FIG. 2, and includes: a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identification module, SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment does not constitute a specific limitation on the UE. In some other embodiments, the UE may include more or fewer components than those shown in the figure, some components may be combined, or some components may be split, or different component arrangements may be used. The components shown in the figure may be implemented by using hardware, software, or a combination of software and hardware.

The processor 210 may include one or more processing units. For example, the processor 210 may include an application processor (application processor, AP), a modem, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The charging management module 240 is configured to receive a charging input from a charger. The charger may be a wireless charger or a wired charger.

The power management module 241 is configured to connect to the battery 242, the charging management module 240, and the processor 210. The power management module 241 receives an input from the battery 242 and/or the charging management module 240, and supplies power to the processor 210, the internal memory 221, the display 294, the camera 293, the wireless communication module 260, and the like.

A wireless communication function of the UE may be implemented through the antenna 1, the antenna 2, the mobile communication module 250, the wireless communication module 260, the modem, the baseband processor, and the like.

The antenna 1 and the antenna 2 are configured to transmit and receive electromagnetic wave signals. Each antenna in the UE may be configured to cover one or more communication frequency bands. Different antennas may be further multiplexed, to improve antenna utilization.

The mobile communication module 250 may provide a solution that is applied to the UE and that is for wireless communication including 2G/3G/4G/5G and the like.

The wireless communication module 260 may provide a solution that is applied to the UE and that is for wireless communication including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 260 may be one or more components integrating at least one communication processing module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave through the antenna 2 for radiation.

In embodiments of this application, the wireless communication module 260 may be used by the UE to send a data frame of a current service to a network node, and receive a data frame sent by the network node.

The UE implements a display function through the GPU, the display 294, the application processor, and the like. The GPU is a microprocessor for image processing, and is connected to the display 294 and the application processor.

The display 294 is configured to display an image, a video, and the like. A series of graphical user interfaces (graphical user interface, GUI) may be displayed on the display 294 of the UE.

The UE may implement a photographing function through the ISP, the camera 293, the video codec, the GPU, the display 294, the application processor, and the like.

The camera 293 is configured to capture a static image or a video.

The external memory interface 220 may be configured to connect to an external storage card, for example, a micro SD card, to extend a storage capability of the UE.

The internal memory 221 may be configured to store computer-executable program code. The executable program code includes instructions. The processor 210 runs the instructions stored in the internal memory 221, to perform various function applications and data processing of the UE.

The UE may implement an audio function, for example, music playing and recording, through the audio module 270, the speaker 270A, the receiver 270B, the microphone 270C, the headset jack 270D, the application processor, and the like. The UE may further include the pressure sensor 280A, the barometric pressure sensor 280C, the gyroscope sensor 280B, the magnetic sensor 280D, the acceleration sensor 280E, the distance sensor 280F, the optical proximity sensor 280G, the ambient light sensor 280L, the fingerprint sensor 280H, the temperature sensor 280J, the touch sensor 280K, the bone conduction sensor 280M, the button 290, the motor 291, the indicator 292, and the like.

The SIM card interface 295 is configured to connect to a SIM card. The SIM card may be inserted into the SIM card interface 295 or removed from the SIM card interface 295, to implement contact with or separation from the UE. The UE may support one or N SIM card interfaces, where N is a positive integer greater than 1. The SIM card interface 295 may support a Nano SIM card, a Micro SIM card, a SIM card, or the like. A plurality of cards may be simultaneously inserted into a same SIM card interface 295. The SIM card interface 295 is also compatible with an external storage card. The UE interacts with a network through the SIM card, to implement functions such as a call and data communication.

In addition, an operating system runs on the foregoing components. The operating system is, for example, a Harmony operating system, an iOS operating system, an Android operating system, a Windows operating system, or the like. An application may be installed and run on the operating system. In some other embodiments, there may be a plurality of operating systems running on the UE.

It should be understood that the hardware modules included in the UE shown in FIG. 2 are merely used as an example for description, and do not constitute a limitation on the specific structure of the UE. In fact, the UE provided in embodiments of this application may further include other hardware modules having an interaction relationship with the hardware modules shown in the figure. This is not specifically limited herein. For example, the UE may further include a flash light, a miniature projection apparatus, and the like. For another example, if the UE is a PC, the UE may further include components such as a keyboard and a mouse.

In addition, it should be noted that, based on a feature of periodicity of SPS, the technical solutions provided in embodiments of this application may be applied to a service with periodicity in the foregoing system, for example, an XR service.

It should be understood that, descriptions of services in all embodiments of this application are intended to facilitate understanding of the technical solutions provided in this application, and are not used as a limitation on a service scenario to which the technical solutions provided in this application are applicable.

In addition, it may be understood that XR means all real and virtual combined environments and human-computer interactions generated by computer technologies and wearable devices. Representative forms are augmented reality (Augmented Reality, AR), mixed reality (Mixed Reality, MR), virtual reality (Virtual Reality, VR), and cross scenarios between AR, MR, and VR.

To better understand the technical solutions provided in embodiments of this application, a current problem of mismatch between an SPS time-frequency resource and an XR service frame is specifically described below with reference to FIG. 3.

A VR service scenario of the XR service is used as an example. Video content that needs to be displayed is processed through an encoder and a decoder. Specifically, the encoder encodes a plurality of pictures (where each frame represents a still picture) and generates groups of pictures (Group of Pictures, GOP). During playback, the decoder reads the GOPs for decoding and then reads images for rendering and display.

It may be understood that the GOP is a group of consecutive images, including one I frame and a plurality of B frames/P frames, and is a basic unit for access of a video image encoder and decoder. An arrangement sequence of the frames is repeated until the end of a video. The I frame is an intra-coded frame (also referred to as a key frame), the P frame is a forward predictive frame (forward reference frame/forward difference frame), and the B frame is a bidirectional interpolated frame (bidirectional reference frame/bidirectional difference frame).

Briefly, the I frame is a complete image, and only data of the I frame is required to complete decoding (because the frame includes the complete image). The P frame indicates a difference between the P frame and a previous I frame (or P frame). During decoding, a previously buffered image and the difference defined in the P frame need to be superimposed, to generate a final image. In other words, the P frame does not have complete image data, and has only data that indicates a difference from an image of the previous frame. The B frame records differences between the B frame and previous and subsequent frames. In other words, to decode the B frame, not only a previous buffered image is required, but also a subsequent image needs to be decoded, to obtain a final image by superimposing data corresponding to previous and subsequent images with data of the B frame.

Figure 3:
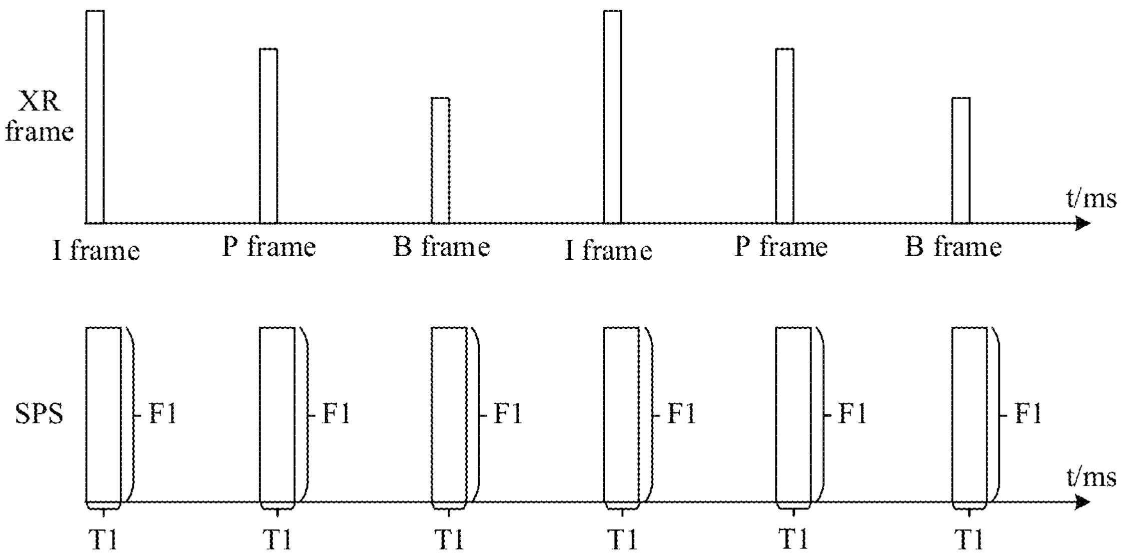
FIG. 3 is a diagram of an example of mismatch between an SPS time-frequency resource and an XR service frame.

Based on this, it can be learned that the I frame is the largest, the B frame is the smallest, and a size of the P frame is between that of the I frame and that of the B frame, as shown in an XR frame in FIG. 3. However, once SPS is activated for use, time-frequency resource configuration information corresponding to a time-frequency resource (referred to as an SPS resource below) scheduled at each scheduling periodicity is fixed. As shown in FIG. 3, a time-frequency resource scheduled at each scheduling periodicity has a time domain resource size of T1 and a frequency domain resource size of F1. Clearly, current time-frequency resource allocation of SPS cannot match diversified requirements of the XR service, resulting in a waste of resources such as power consumption of a UE and a system capacity of a base station.

Based on this, to resolve the problem caused by mismatch between a time-frequency resource of SPS and a frame of a service having a feature of periodicity, embodiments of this application provide a semi-persistent scheduling method. In the method, time-frequency resources of a plurality of sizes are configured for SPS, so that at each scheduling periodicity of SPS, time-frequency resources of different sizes can be cyclically scheduled based on a configuration. In this way, the time-frequency resources of SPS match diversified requirements for radio resources of a service having a feature of periodicity, and therefore power consumption of a user equipment is reduced and a system capacity of a base station can be avoided.

Before the technical solutions in embodiments of this application are described, an uplink SPS manner and a downlink SPS manner in current semi-persistent scheduling are first described.

For example, for downlink SPS, a network side, for example, a base station (gNB), may first configure a UE with a periodicity of data transmission via RRC signaling, and then activate downlink SPS and specify a radio resource for downlink SPS (briefly referred to as a downlink SPS resource below) by using a physical downlink control channel (Physical Downlink Control Channel, PDCCH) (referred to as a downlink control channel below) scrambled by a configured scheduling-radio network temporary identifier (Configured Scheduling-Radio Network Temporary Identifier, CS-RNTI). Then, at each periodicity, the UE may use the downlink SPS resource to receive a physical downlink shared channel (Physical Downlink Shared Channel, PDSCH) (referred to as a downlink data channel below), and the gNB does not need to resend a PDCCH to specify an allocated downlink SPS resource.

It should be understood that the CS-RNTI is used for SPS scheduling, and is carried on RRC signaling and sent to the UE. Specifically, when the UE receives a PDCCH sent by the gNB, if the PDCCH is scrambled by the CS-RNTI, it indicates that SPS currently needs to be used to adapt to a service.

Then, when it is determined that SPS currently needs to be used to adapt to the service, initiation/activation or release of SPS may be determined by decoding the PDCCH.

For example, if it is determined to activate SPS based on a decoding result, the UE decodes downlink control information (Downlink Control Information, DCI) in a PDCCH corresponding to the first downlink data frame, and determines specific time-frequency resource information (referred to as downlink resource information below for ease of distinguishing) of a PDSCH on which the gNB transmits service data. Then, the UE decodes the PDSCH based on the obtained downlink resource information, to obtain the service data sent by the gNB.

Correspondingly, after downlink SPS is activated, for a subsequent downlink data frame, the gNB does not need to occupy a PDCCH to send DCI to allocate a downlink SPS resource for service data sent by the gNB; and the UE decodes a PDSCH by using the same downlink resource information (the downlink resource information obtained when SPS is activated) according to the SPS periodicity configured in the RRC signaling, to obtain the subsequent downlink data frame.

It should be noted that the "same downlink resource information" in this embodiment means that for the downlink resource information, a frequency domain resource size is the same, and a time domain resource size is the same, but a start location is not limited to be the same.

In addition, it may be understood that if the PDCCH is scrambled by a cell-radio network temporary identifier (Cell-RadioNetworkTemporaryIdentifier, C-RNTI) during actual application, it indicates that the current scheduling is normal scheduling, namely, dynamic scheduling, and not SPS scheduling.

For example, for uplink SPS, there are two manners, and a main difference lies in different activation manners.

A manner 1 is referred to as a type 1 (Configured grant type 1, CG type 1) below. In this manner, all parameters are configured and uplink transmission is activated via RRC signaling. A UE may send a physical uplink shared channel (Physical Uplink Shared CHannel, PUSCH) on a configured periodic uplink resource as long as configuration succeeds, without a need of activation by using DCI.

A manner 2 is referred to as a type 2 (Configured grant type 2, CG type 2) below. In this manner, a network side may first configure a UE with a periodicity of data transmission via RRC signaling, and then activate uplink SPS and specify a radio resource for uplink SPS (briefly referred to as an uplink SPS resource below) by using a PDCCH scrambled by a CS-RNTI. Then, at each periodicity, the UE may use the uplink SPS resource to send a PUSCH.

Specifically, for the type 2, a gNB may first send DCI on the PDCCH scrambled by the CS-RNTI. Correspondingly, the UE decodes the DCI in the PDCCH, and determines specific time-frequency resource information (referred to as uplink resource information below for ease of distinguishing) specified by the gNB for the UE to send a PUSCH including service data. Then, when the UE needs to send service data to the gNB, the UE sends the service data to the gNB on a PUSCH based on the obtained uplink resource information.

Correspondingly, after uplink SPS is activated, for a subsequent uplink data frame, the gNB does not need to occupy a PDCCH to send DCI to allocate an uplink SPS resource for service data sent by the UE; and the UE may send, to the gNB on a PUSCH by using the same uplink resource information (the uplink resource information obtained when SPS is activated) according to the SPS periodicity configured in the RRC signaling, the subsequent uplink data frame that needs to be sent.

It should be noted that the "same uplink resource information" in this embodiment means that for the uplink resource information, a frequency domain resource size is the same, and a time domain resource size is the same, but a start location is not limited to be the same.

It can be learned based on the foregoing descriptions that activation of SPS may be classified into activation by using DCI and activation by using RRC signaling. This application provides technical solutions for these two activation manners.

Solution 1: Time-Frequency Resource Configuration for Downlink SPS and Uplink SPS Activated in the CG Type 2 Manner (Uplink CG Type 2)

For example, both downlink SPS and uplink CG type 2 are activated by using DCI sent by a gNB. There are many fields in the DCI, for example, a frequency domain resource assignment (Frequency domain resource assignment, FDRA) field for configuring a frequency domain resource size, a time domain resource assignment (Time domain resource assignment, TDRA) field for configuring a time domain resource size, and a modulation configuration coding (Modulation and coding scheme, MCS) field for configuring a modulation and coding scheme. The fields are not listed one by one herein.

Based on this, in this solution, a plurality of frequency domain resources available for cyclic scheduling are configured by multiplexing the FDRA field in the DCI, a plurality of time domain resources available for cyclic scheduling are configured by multiplexing the TDRA field in the DCI, and a plurality of modulation and coding schemes available for cyclic scheduling are configured by multiplexing the MCS field in the DCI.

For ease of description, the semi-persistent scheduling method provided in this application is described by using an example in which a plurality of frequency domain resources available for cyclic scheduling are configured by multiplexing the FDRA field in the DCI, to change sizes of radio resources of SPS to adapt to different XR service frames.

Figure 4:
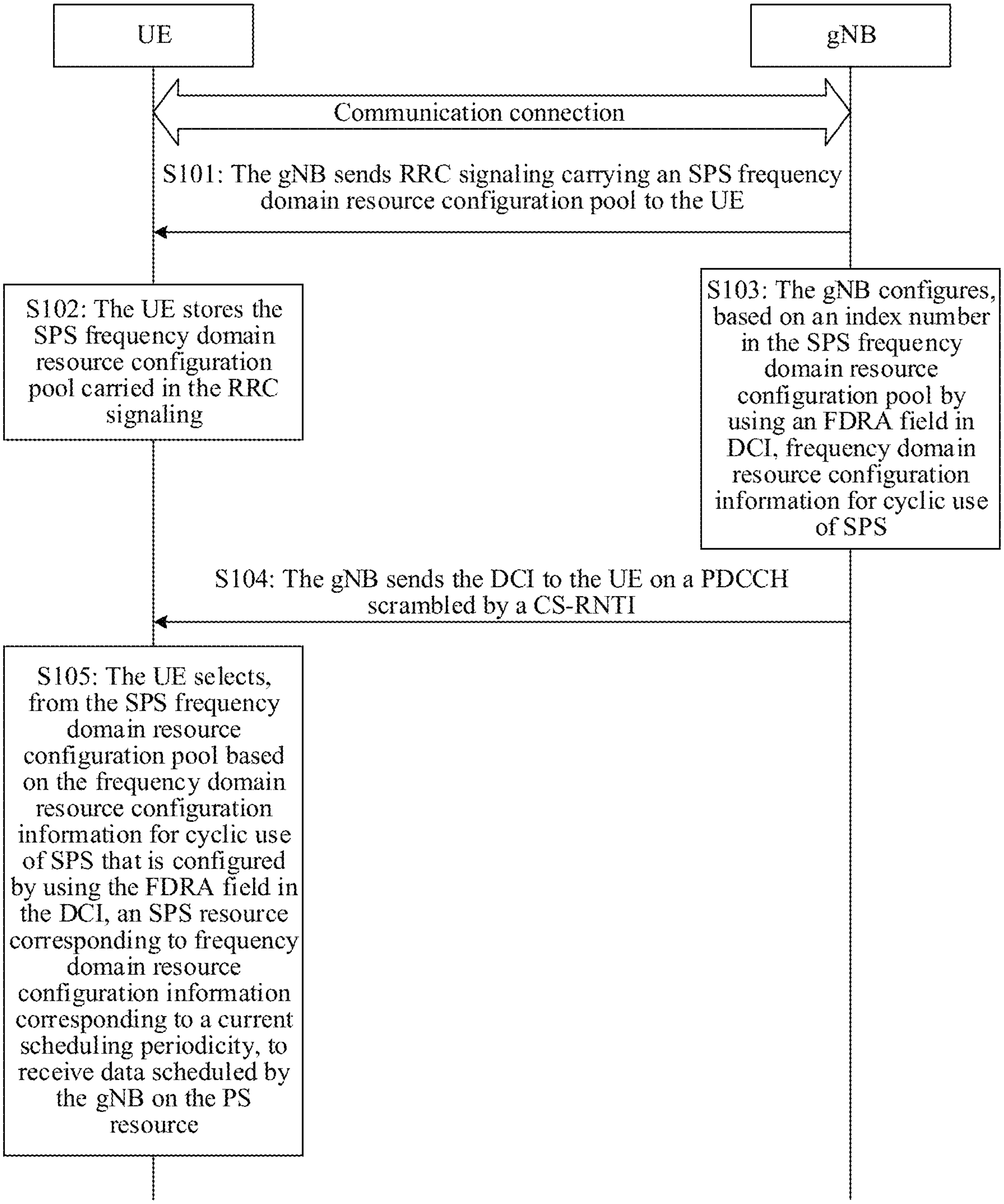
FIG. 4 is a first timing diagram of an example of setting an SPS time-frequency resource according to a semi-persistent scheduling method according to an embodiment of this application.

With reference to FIG. 4, in this embodiment, the method includes the following steps.

S101: A gNB sends RRC signaling carrying an SPS frequency domain resource configuration pool to a UE.

For example, that an SPS-adapted service is an XR service is used as an example, and the gNB may configure related parameters for SPS based on existing service frames (for example, an I frame, a P frame, and a B frame) of the XR service.

In other words, during actual application, the SPS frequency domain resource configuration pool may include a plurality of pieces of frequency domain resource configuration information for different service frames.

Pieces of SPS frequency domain configuration information (Sps-Fdraconfig) in the SPS frequency domain resource configuration pool may be shown, for example, in the following form: Sps-Fdraconfig {index 1, frequency domain configuration 1}, Sps-Fdraconfig {index 2, frequency domain configuration 2}, Sps-Fdraconfig {index 3, frequency domain configuration 3}, . . . .

It may be understood that index numbers such as the index 1, the index 2, and the index 3 are used to identify frequency domain configurations in the SPS frequency domain resource configuration pool in which the index numbers are located. For example, the index 1 identifies the frequency domain configuration 1, the index 2 identifies the frequency domain configuration 2, and the index 3 identifies the frequency domain configuration 3.

It should be noted that in an actual application scenario, each index is different, and a frequency domain configuration identified by each index may be the same or different. This is not limited in this embodiment.

It should be understood that the foregoing descriptions are merely an example enumerated for better understanding of the technical solution in this embodiment, and are not used as a unique limitation on this embodiment.

S102: The UE stores the SPS frequency domain resource configuration pool carried in the RRC signaling.

It may be understood that for downlink SPS and uplink CG type 2, frequency domain resource configuration information of an SPS resource scheduled at each scheduling periodicity after activation of uplink CG type 2 and downlink SPS may be selected from the SPS frequency domain resource configuration pool based on DCI sent by the gNB. Therefore, after receiving the RRC signaling sent by the gNB, the UE may first locally store the SPS frequency domain resource configuration pool carried in the RRC signaling, wait for the DCI sent by the gNB, and then determine the frequency domain resource configuration information of the SPS resource scheduled at each scheduling periodicity for downlink SPS and uplink CG type 2.

S103: The gNB configures, based on an index number in the SPS frequency domain resource configuration pool by using an FDRA field in the DCI, frequency domain resource configuration information for cyclic use of SPS.

Specifically, in an existing communication standard, configuration information corresponding to the FDRA field in the DCI may be represented by, for example, a start location and length information, or a bitmap.

This embodiment describes an existing setting of the FDRA field in the representation manner using the start location and the length information, for example, as shown in Table 1.

TABLE 1

Existing setting of the FDRA field when uplink CG type 2 and downlink SPS are activated by using DCI

| | DCI format 0_0/0_1/0_2; DCI format 1_0/1_2; DCI format 1_1 |
|---|---|
| FDRA | RIV (Resource indicator value) indicates start "A" and length "B" |

It should be noted that, as specified in the existing communication standard, a type of uplink data and a type of downlink data are differentially identified in the DCI. Uplink is represented by "0_", for example, "0_0", "0_1", and "0_2" in the foregoing table. Downlink is represented by "1_", for example, "1_0", "1_1", and "1_2" in the foregoing table.

For example, according to the setting "RIV (Resource indicator value) indicates start 'A' and length 'B'" of Table 1, frequency domain resources of radio resources of uplink CG type 2 and downlink SPS are both set with a start location "A" and a length "B" during implementation.

To implement cyclic scheduling of frequency domain resources (SPS resources) of a plurality of sizes, in the technical solution provided in this embodiment, the FDRA field is multiplexed and setting information of the FDRA field is redefined, to implement cyclic scheduling of frequency domain resources of a plurality of sizes, so that different service frames correspond to frequency domain resources of different sizes, and match between an SPS frequency domain resource and a service frame is implemented.

In addition, it should be noted that, during actual application, the FDRA field is a field with variable bits. For example, in a scenario of a bandwidth of 20 M, the FDRA field can reach up to 13 bits. Therefore, agreements may be made based on quantities of bits of the FDRA field that correspond to different bandwidths.

For ease of description, in this embodiment, descriptions are provided by using an example in which a bandwidth is 20 M and the FDRA field includes 13 bits.

For example, for the foregoing scenario, it may be agreed on that every four bits correspond to one index in the SPS frequency domain resource configuration pool, so that three frequency domain configurations may be configured by using the FDRA field for cyclic use. Based on this, setting information of a modified FDRA field is added to the corresponding communication standard, and subsequently when a frequency domain resource corresponding to a radio resource for cyclic scheduling is configured for the UE, an SPS frequency domain resource matching a service frame may be selected based on the modified FDRA field and the SPS frequency domain resource configuration pool.

The modified FDRA field may be, for example, as shown in Table 2.

TABLE 2

Setting of the FDRA field when uplink CG type 2 and downlink SPS are activated by using DCI in this embodiment

| | DCI format 0_0/0_1/0_2; DCI format 1_0/1_2; DCI format 1_1 |
|---|---|
| FDRA (20M, maximum of 13 bits) | set to (sps-FdraConfigindexA: 4 bits, sps-FdraConfigindexB: 4 bits, . . .) |

With reference to Table 2, "FDRA (20 M, maximum of 13 bits)" indicates that the FDRA field occupies a maximum of 13 bits at the bandwidth of 20 M. "Set to (sps-FdraConfigindexA: 4 bits, sps-FdraConfigindexB: 4 bits, . . . )" means that for the 13 bits of the FDRA field, a value of every four bits is set to correspond to one index number, for example, the index number sps-FdraConfigindexA or sps-FdraConfigindexB. In addition, sps-FdraConfigindexA and sps-FdraConfigindexB are any two index numbers in the SPS frequency domain resource configuration pool sent by the gNB to the UE.

For example, in some implementations, as set in Table 2, uplink CG type 2 and downlink SPS each may be set with a plurality of frequency domain resources for cyclic use during SPS scheduling. To be specific, every four bits correspond to an index of one frequency domain configuration.

For example, in some other implementations, uplink CG type 2 may be set with a plurality of frequency domain resources, and a fixed frequency domain may be used for downlink SPS, so that during SPS scheduling, the plurality of set frequency domain resources can be cyclically scheduled for uplink CG type 2, and a same frequency domain resource is scheduled and used for downlink SPS.

It should be understood that the foregoing descriptions are merely an example enumerated for better understanding of the technical solution in this embodiment, and are not used as a unique limitation on this embodiment.

S104: The gNB sends the DCI to the UE on a PDCCH scrambled by a CS-RNTI.

S105: The UE selects, from the SPS frequency domain resource configuration pool based on the frequency domain resource configuration information for cyclic use of SPS that is configured by using the FDRA field in the DCI, an SPS resource corresponding to frequency domain resource configuration information corresponding to a current scheduling periodicity, to receive data scheduled by the gNB on the SPS resource.

The agreement shown in Table 2 is used as an example. Based on the foregoing agreement, if the FDRA field in the DCI is "0001001000110", it indicates that frequency domain resource configuration information of cyclically used radio resources is a frequency domain configuration 1 corresponding to an index 1 (0001), a frequency domain configuration 2 corresponding to an index 2 (0010), and a frequency domain configuration 3 corresponding to an index 3 (0011) in the SPS frequency domain resource configuration pool. That is, the frequency domain configuration 1, the frequency domain configuration 2, the frequency domain configuration 3, the frequency domain configuration 1, the frequency domain configuration 2, the frequency domain configuration 3, . . . .

It should be noted that, when the FDRA field has the maximum of 13 bits, a value of the $13^{th}$ bit does not affect the technical solution provided in this embodiment. During actual application, the value of the $13^{th}$ bit of the FDRA field may be set to "0" or "1" by default. In the foregoing example "0001001000110", "0" is used as an example.

Figure 5:
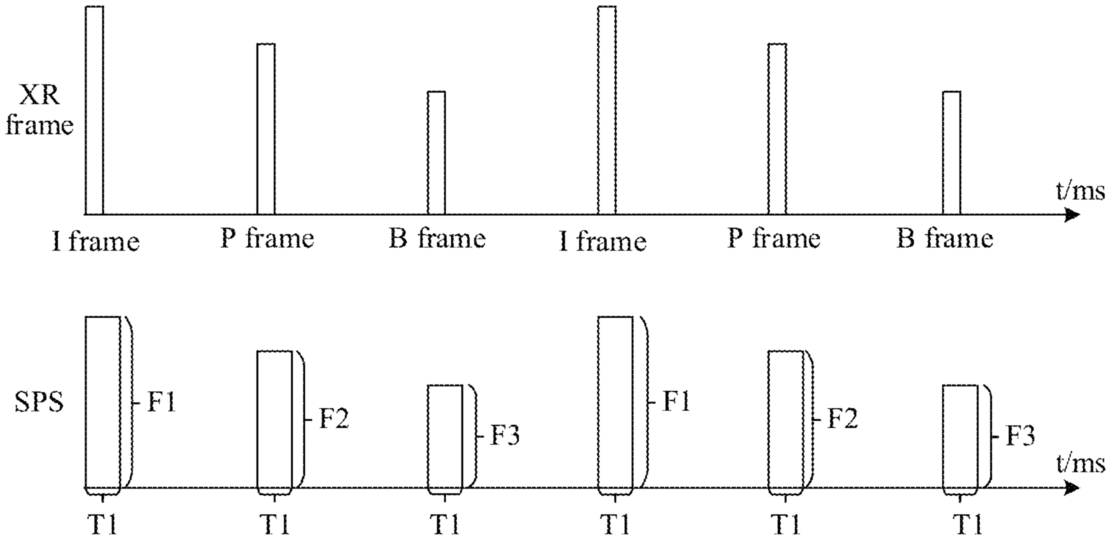
FIG. 5 is a first diagram of an example of match between an SPS time-frequency resource and an XR service frame.

For example, if a frequency domain resource corresponding to the frequency domain configuration 1 (corresponding to F1 in FIG. 5) is the largest, a frequency domain resource corresponding to the frequency domain configuration 3 (corresponding to F3 in FIG. 5) is the smallest, and a frequency domain resource corresponding to the frequency domain configuration 2 (corresponding to F2 in FIG. 5) has a size between that of the frequency domain resource corresponding to the frequency domain configuration 1 and that of the frequency domain resource corresponding to the frequency domain configuration 3, when time domain resources are unchanged, for example, a time domain resource size of a radio resource scheduled for SPS scheduling at each scheduling periodicity in FIG. 5 is T1, a radio resource with a frequency domain resource size of F1 and a time domain resource size of T1 is configured for SPS when an XR frame that needs to be processed is the largest I frame, a radio resource with a frequency domain resource size of F3 and a time domain resource size of T1 is configured for SPS when the XR frame that needs to be processed is the smallest B frame, and a radio resource with a frequency domain resource size of F2 and a time domain resource size of T1 is configured for SPS when the XR frame that needs to be processed is the P frame, as shown in FIG. 5.

It should be understood that the foregoing descriptions are merely an example enumerated for better understanding of the technical solution in this embodiment, and are not used as a unique limitation on this embodiment.

In this way, in the technical solution provided in this embodiment, the gNB configures the SPS frequency domain resource configuration pool in advance, and configures, by using the FDRA field in the DCI, a plurality of pieces of frequency domain resource configuration information available for cyclic use for uplink CG type 2 and downlink SPS, so that uplink CG type 2 and downlink SPS can implement cyclic scheduling of frequency domain resources of a plurality of sizes, different service frames correspond to frequency domain resources of different sizes, and match between an SPS frequency domain resource and a service frame is implemented. Therefore, power consumption of the user equipment is reduced, and reduction of a system capacity of the base station can be avoided.

It should be noted that, in an actual application scenario, the technical solution provided in this embodiment is also applicable to a service scenario of a single piece of frequency domain resource configuration information. Specifically, for a scenario in which a single periodicity needs to be configured for uplink CG type 2 and downlink SPS, content corresponding to every four bits in the FDRA field may be the same.

For example, when the FDRA field is "0001000100010", it indicates that data scheduled by the gNB on a PS resource is always received by using the frequency domain configuration 1 corresponding to the index 1.

For another example, when the FDRA field is "0010001000100", it indicates that data scheduled by the gNB on a PS resource is always received by using the frequency domain configuration 2 corresponding to the index 2.

For another example, when the FDRA field is "0011001100110", it indicates that data scheduled by the gNB on a PS resource is always received by using the frequency domain configuration 3 corresponding to the index 3.

It may be understood that, in some implementations, it may be agreed on that "0000" is an invalid configuration.

Correspondingly, if it is agreed on that "0000" is an invalid configuration, when data scheduled by the gNB on an SPS resource is received by using the frequency domain configuration 1 corresponding to the index 1 by default, content of the FDRA field may be "0001000000000"; when data scheduled by the gNB on an SPS resource is received by using the frequency domain configuration 2 corresponding to the index 2 by default, content of the FDRA field may be "0010000000000"; and when data scheduled by the gNB on an SPS resource is received by using the frequency domain configuration 3 corresponding to the index 3 by default, content of the FDRA field may be "0011000000000".

It should be noted that, when the FDRA field has the maximum of 13 bits, a value of the $13^{th}$ bit does not affect the technical solution provided in this embodiment. During actual application, the value of the $13^{th}$ bit of the FDRA field may be set to "0" or "1" by default. In the foregoing examples "0001000100010", "0010001000100", "0011001100110", and "0011000000000", "0" is used as an example.

It should be understood that the foregoing descriptions are merely an example enumerated for better understanding of the technical solution in this embodiment, and are not used as a unique limitation on this embodiment.

In the scenario of a bandwidth of 20 M, because the FDRA field has a maximum of only 13 bits, if it is agreed on that four bits correspond to an index of one frequency domain configuration, a maximum of only three cyclically used frequency domain configurations can be selected, and only frequency domain configurations corresponding to 15 index numbers index 1 to index 15 are available in the SPS frequency domain resource configuration pool (where it is agreed on that "0000" is an invalid value and is not used).

For example, if it is agreed on that three bits correspond to an index of one frequency domain configuration, a maximum of only four cyclically used frequency domain configurations can be selected, and only frequency domain configurations corresponding to seven index numbers index 1 to index 7 are available in the SPS frequency domain resource configuration pool (where it is agreed on that "000" is an invalid value and is not used).

For example, if it is agreed on that two bits correspond to an index of one frequency domain configuration, a maximum of only six cyclically used frequency domain configurations can be selected, and only frequency domain configurations corresponding to three index numbers index 1 to index 3 are available in the SPS frequency domain resource configuration pool (where it is agreed on that "00" is an invalid value and is not used).

Therefore, applicable scenarios are limited. To enable the technical solutions provided in this application to be applicable to more service scenarios, and implement cycling of more frequency domains, another implementation is provided based on the foregoing embodiment.

Figure 6:
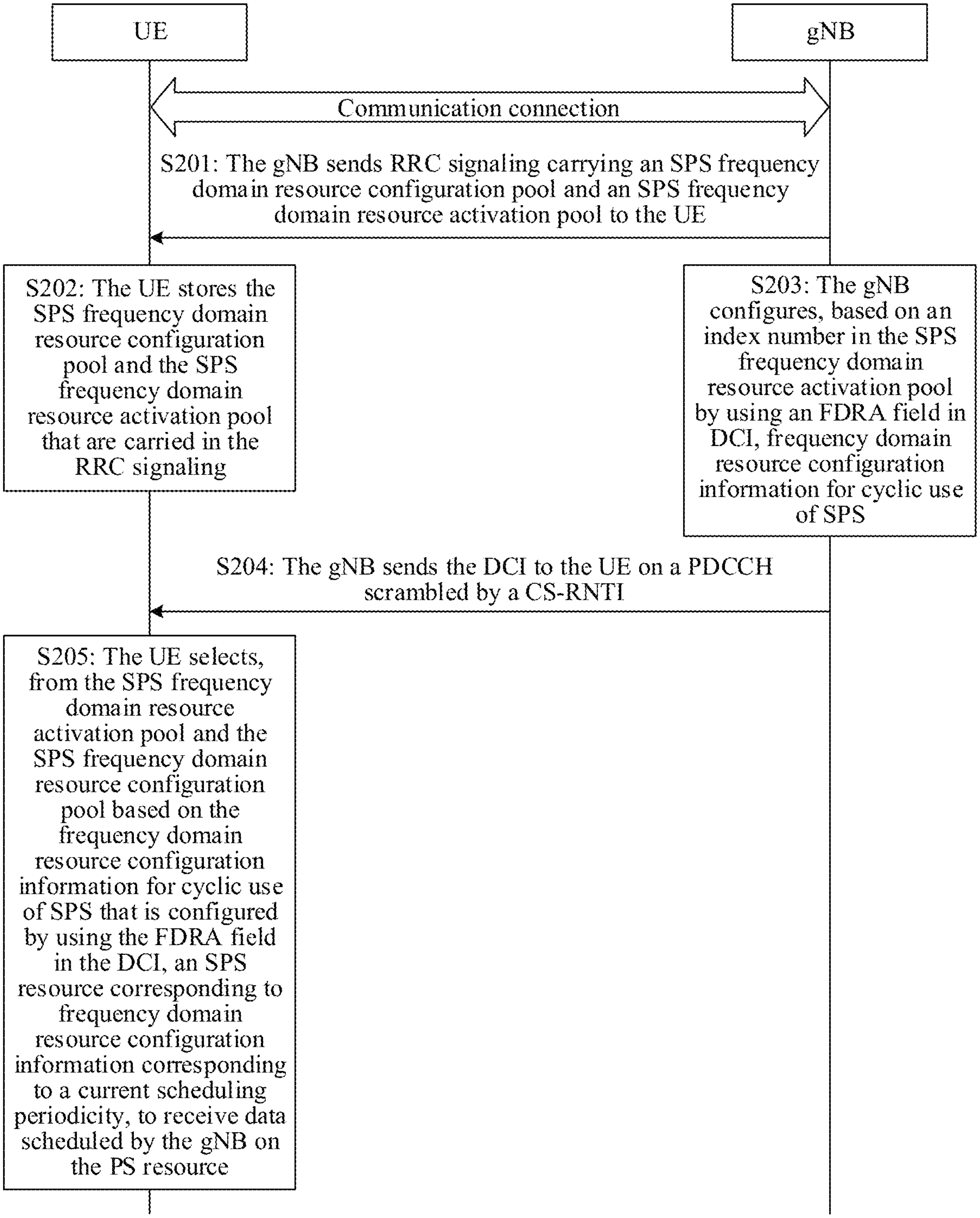
FIG. 6 is a second timing diagram of an example of setting an SPS time-frequency resource according to a semi-persistent scheduling method according to an embodiment of this application.

With reference to FIG. 6, in this embodiment, the method includes the following steps.

S201: A gNB sends RRC signaling carrying an SPS frequency domain resource configuration pool and an SPS frequency domain resource activation pool to a UE.

S202: The UE stores the SPS frequency domain resource configuration pool and the SPS frequency domain resource activation pool that are carried in the RRC signaling.

S203: The gNB configures, based on an index number in the SPS frequency domain resource activation pool by using an FDRA field in DCI, frequency domain resource configuration information for cyclic use of SPS.

S204: The gNB sends the DCI to the UE on a PDCCH scrambled by a CS-RNTI.

S205: The UE selects, from the SPS frequency domain resource activation pool and the SPS frequency domain resource configuration pool based on the frequency domain resource configuration information for cyclic use of SPS that is configured by using the FDRA field in the DCI, an SPS resource corresponding to frequency domain resource configuration information corresponding to a current scheduling periodicity, to receive data scheduled by the gNB on the PS resource.

A difference between this embodiment and the foregoing embodiment lies in that the RRC signaling sent by the gNB to the UE includes the SPS frequency domain resource activation pool in addition to the SPS frequency domain resource configuration pool configured in the foregoing embodiment, and the difference is emphatically described below. For same or similar parts, refer to the embodiment shown in FIG. 4. This is not described herein again.

Each piece of SPS frequency domain resource activation information in the SPS frequency domain resource activation pool mentioned above may include, for example, an index number identifying the SPS frequency domain resource activation information and an index number (an index number in the SPS frequency domain resource configuration pool) corresponding to a frequency domain configuration that is available for cycling and corresponds to the index number.

For example, the SPS frequency domain resource activation pool may include one or more pieces of SPS frequency domain resource activation information. Each piece of SPS frequency domain resource activation information may include, for example, an index number identifying the SPS frequency domain resource activation information, an index number of SPS frequency domain resource configuration information that is available for cycling and corresponds to the index number, and a sequence of the index number of the SPS frequency domain resource configuration information available for cycling.

For example, that the SPS frequency domain resource activation pool includes a plurality of pieces of SPS frequency domain resource activation information is used as an example, and the SPS frequency domain resource activation pool may be shown, for example, in the following form: sps-FdraConfigActivationList {1: {1, 2}, 2: {1, 2, 3}, 3: {3, 1}, 4: {3, 2}, . . . }.

A parameter before ":" is an index number identifying a piece of SPS frequency domain resource activation information, and a parameter in "{ }"after ":" is an index number (an index number in the SPS frequency domain resource configuration pool) corresponding to frequency domain resource configuration information that is available for cycling and corresponds to the index number. During actual application, a plurality of index numbers (index numbers in the SPS frequency domain resource configuration pool) corresponding to frequency domain resource configuration information available for cycling may be selected from the SPS frequency domain resource configuration pool based on a service requirement. This is not limited in this embodiment.

In addition, for the solution in which the SPS frequency domain resource activation pool is set, all bits of the FDRA field may be agreed on. For example, 13 bits at a bandwidth of 20 M correspond to index numbers of SPS frequency domain resource activation information in an SPS frequency domain resource activation pool. In this case, "0000000000000" to "1111111111111" may correspond to index numbers of $2^{13}$ pieces of SPS frequency domain resource activation information, and a plurality of corresponding index numbers (index numbers in the SPS frequency domain resource configuration pool) corresponding to frequency domain resource configuration information available for cycling may be configured for an index number of each piece of SPS frequency domain resource activation information based on a service requirement. In this way, more configuration manners can be supported, so that there are more frequency domain configurations available for cyclic use, and this can adapt to an XR service with diversified requirements.

Similarly, in some implementations, it may be agreed on that "0000000000000" is an invalid configuration.

Based on this, setting information of a modified FDRA field is added to a corresponding communication standard, and subsequently when a frequency domain resource corresponding to a radio resource for cyclic scheduling is configured for the UE, a radio resource matching a service frame may be selected based on the modified FDRA field, the SPS frequency domain resource activation pool, and the SPS frequency domain resource configuration pool.

The modified FDRA field may be, for example, as shown in Table 3.

TABLE 3

Setting of the FDRA field when uplink CG type 2 and downlink SPS are activated by using DCI in this embodiment

| | DCI format 0_0/0_1/0_2; DCI format 1_0/1_2; DCI format 1_1 |
|---|---|
| FDRA (20M, maximum of 13 bits) | set to sps-FdraConfigActivationListindex (index number of SPS frequency domain resource activation information in the SPS frequency domain resource activation pool) |

The agreement shown in Table 3 is used as an example. Based on the foregoing agreement, if the FDRA field in the DCI is "0000000000010", it indicates that subsequent (or next-frame) SPS resource scheduling is cyclic scheduling of frequency domain configurations of SPS frequency domain resource configuration information {1, 2, 3}corresponding to SPS frequency domain resource activation information with an index number "2" in the SPS frequency domain resource activation pool, that is, a frequency domain configuration 1, a frequency domain configuration 2, a frequency domain configuration 3, the frequency domain configuration 1, the frequency domain configuration 2, the frequency domain configuration 3, . . . .

Correspondingly, if the FDRA field in the DCI is "0000000000001", it indicates that subsequent SPS resource scheduling is periodic and cyclic scheduling of SPS configuration information {1, 2}corresponding to SPS activation information with an index number "1" in the SPS resource activation pool, that is, a frequency domain configuration 1, a frequency domain configuration 2, the frequency domain configuration 1, the frequency domain configuration 2, . . . .

It should be understood that the foregoing descriptions are merely an example enumerated for better understanding of the technical solution in this embodiment, and are not used as a unique limitation on this embodiment.

In this way, in the technical solution provided in this embodiment, the gNB configures in advance the SPS frequency domain resource configuration pool that can cover the diversified requirements of the XR service as much as possible and the SPS frequency domain resource activation pool for which a plurality of frequency domain configurations available for cyclic use can be set based on the service requirement, and configures, by using the FDRA field in the DCI, a plurality of pieces of frequency domain resource configuration information available for cyclic use for uplink CG type 2 and downlink SPS, so that uplink CG type 2 and downlink SPS can implement cyclic scheduling of frequency domain resources of a plurality of sizes, different service frames correspond to frequency domain resources of different sizes, and match between an SPS frequency domain resource and a service frame is implemented. Therefore, power consumption of the user equipment is reduced, and reduction of a system capacity of the base station can be avoided.

Similarly, in an actual application scenario, the technical solution provided in this embodiment is also applicable to a service scenario of a single piece of frequency domain resource configuration information. A person skilled in the art may perform setting based on the service requirement. This is not limited in this embodiment.

Descriptions of the solution in which a plurality of pieces of frequency domain resource configuration information available for cyclic use are configured, to allocate SPS resources of different sizes to different service frames, and therefore implement match between a service frame and an SPS resource end here.

In addition, based on the content recorded in the foregoing embodiments, a plurality of pieces of time domain resource configuration information available for cyclic use may be configured, to allocate SPS resources of different sizes to different service frames, and therefore implement match between a service frame and an SPS resource.

Configuration of the time domain resource configuration information for cycling may be implemented by redefining a TDRA field and configuring an SPS time domain resource configuration pool.

For example, because the TDRA field has four bits, in some implementations, it may be agreed on that every two bits in the TDRA field correspond to one time domain configuration. For example, it is agreed on that "11" corresponds to an index 3 and a time domain configuration 3, "10" corresponds to an index 2 and a time domain configuration 2, "01" corresponds to an index 1 and a time domain configuration 1, and "00" indicates an invalid configuration. Based on this, when the TDRA field is "1101", time domain resources that can be cyclically used are the time domain configuration 3, the time domain configuration 1, the time domain configuration 3, the time domain configuration 1, . . . .

It should be understood that the foregoing descriptions are merely an example enumerated for better understanding of the technical solution in this embodiment, and are not used as a unique limitation on this embodiment.

Because the TDRA field has only four bits, only two pieces of time domain resource configuration information available for cyclic use can be selected at a time, that is, only a dual-time domain manner can be used. Therefore, applicable scenarios are limited. To enable the technical solutions provided in this application to be applicable to more service scenarios, an SPS time domain resource activation pool may also be introduced in the solution in which a time domain is separately modified to implement match between a radio resource of SPS and a service frame.

For a manner of introducing the SPS time domain resource activation pool, four bits are used to indicate index numbers of the SPS time domain resource activation pool, so that two indexes can be increased to 16 indexes (where if it is agreed on that "0000" is an invalid configuration, there may alternatively be 15 indexes index 1 to index 15) for time domain configurations, and a plurality of corresponding time domain configurations available for selection can be selected for each index of the SPS time domain resource activation pool based on a service requirement.

Figure 7:
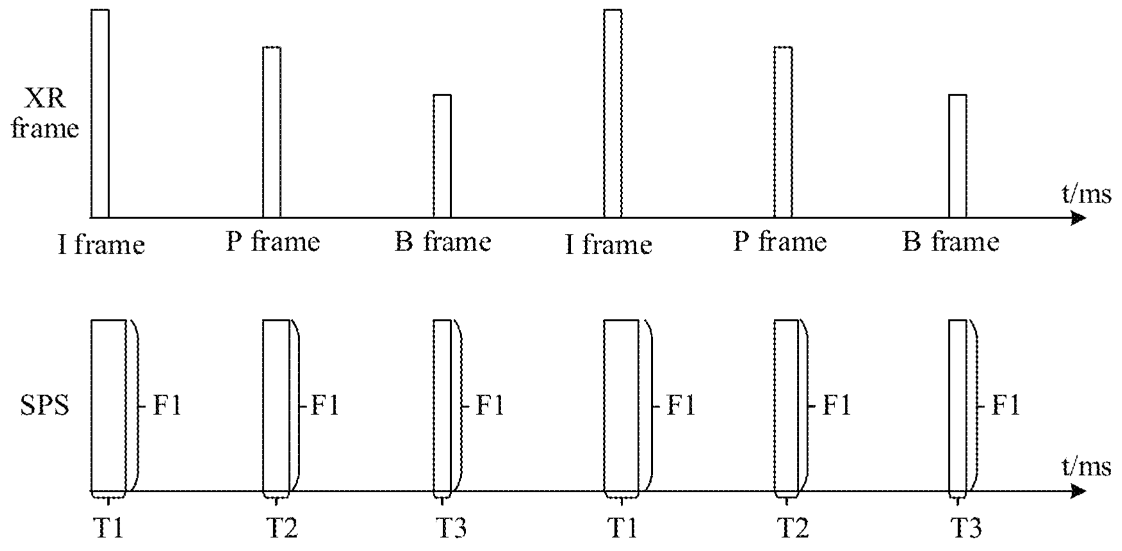
FIG. 7 is a second diagram of an example of match between an SPS time-frequency resource and an XR service frame.

For example, if a time domain resource corresponding to the time domain configuration 1 (corresponding to T1 in FIG. 7) is the largest, a time domain resource corresponding to the time domain configuration 3 (corresponding to T3 in FIG. 7) is the smallest, and a time domain resource corresponding to the time domain configuration 2 (corresponding to T2 in FIG. 7) has a size between that of the time domain resource corresponding to the time domain configuration 1 and that of the time domain resource corresponding to the time domain configuration 3, when frequency domain resource sizes are unchanged, for example, a frequency domain resource size of a radio resource scheduled for SPS scheduling at each scheduling periodicity in FIG. 7 is F1, a radio resource with a frequency domain resource size of F1 and a time domain resource size of T1 is configured for SPS when an XR frame that needs to be processed is a largest I frame, a radio resource with a frequency domain resource size of F1 and a time domain resource size of T3 is configured for SPS when the XR frame that needs to be processed is a smallest B frame, and a radio resource with a frequency domain resource size of F1 and a time domain resource size of T2 is configured for SPS when the XR frame that needs to be processed is a P frame, as shown in FIG. 7.

It should be understood that the foregoing descriptions are merely an example enumerated for better understanding of the technical solution in this embodiment, and are not used as a unique limitation on this embodiment.

In this way, a plurality of pieces of time domain resource configuration information available for cyclic use are configured, to allocate SPS resources of different sizes to different service frames, and therefore implement match between a service frame and an SPS resource.

In addition, it may be understood that, in some other implementations, to implement match between radio resources of SPS scheduling and diversified service requirements of an XR service, the radio resources of SPS scheduling may alternatively be adjusted by modifying both frequency domain configurations and time domain configurations in addition to modifying only the frequency domain configurations or the time domain configurations.

Figure 8:
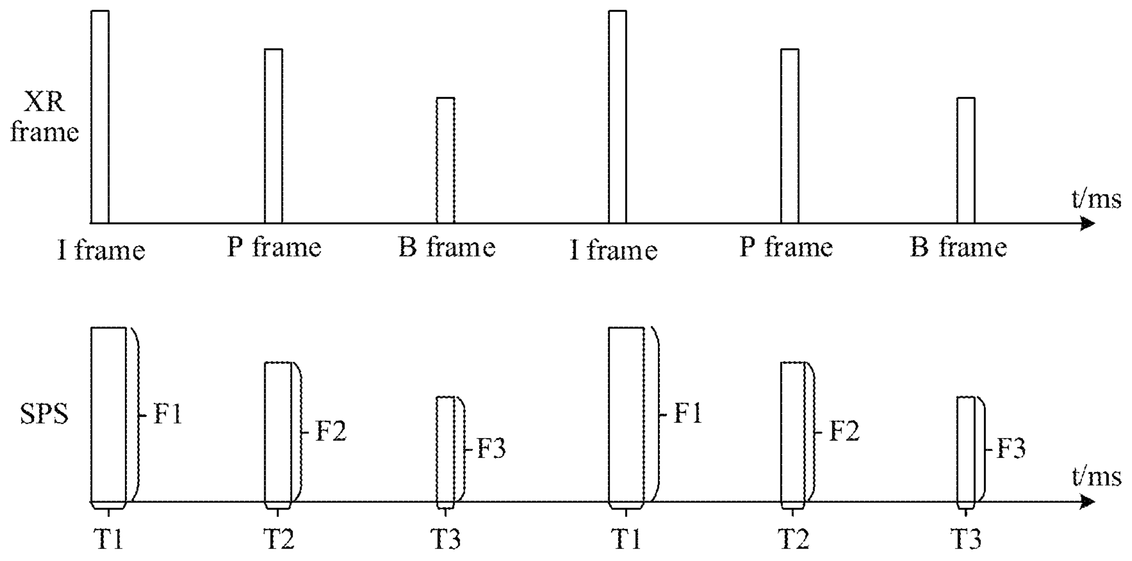
FIG. 8 is a third diagram of an example of match between an SPS time-frequency resource and an XR service frame.

For example, if a time domain resource corresponding to a time domain configuration 1 (corresponding to T1 in FIG. 8) is the largest, a time domain resource corresponding to a time domain configuration 3 (corresponding to T3 in FIG. 8) is the smallest, a time domain resource corresponding to a time domain configuration 2 (corresponding to T2 in FIG. 8) has a size between that of the time domain resource corresponding to the time domain configuration 1 and that of the time domain resource corresponding to the time domain configuration 3, a frequency domain resource corresponding to a frequency domain configuration 1 (corresponding to F1 in FIG. 8) is the largest, a frequency domain resource corresponding to a frequency domain configuration 3 (corresponding to F3 in FIG. 8) is the smallest, and a frequency domain resource corresponding to a frequency domain configuration 2 (corresponding to F2 in FIG. 8) has a size between that of the frequency domain resource corresponding to the frequency domain configuration 1 and that of the frequency domain resource corresponding to the frequency domain configuration 3, a radio resource with a frequency domain resource size of F1 and a time domain resource size of T1 is configured for SPS when an XR frame that needs to be processed is a largest I frame, a radio resource with a frequency domain resource size of F3 and a time domain resource size of T3 is configured for SPS when the XR frame that needs to be processed is a smallest B frame, and a radio resource with a frequency domain resource size of F2 and a time domain resource size of T2 is configured for SPS when the XR frame that needs to be processed is a P frame, as shown in FIG. 8.

It should be understood that the foregoing descriptions are merely an example enumerated for better understanding of the technical solution in this embodiment, and are not used as a unique limitation on this embodiment. During actual application, a time domain configuration and a frequency domain configuration that correspond to the I frame are not limited to be the largest, a time domain configuration and a frequency domain configuration that correspond to the B frame are not limited to be the smallest, and a time domain configuration and a frequency domain configuration that correspond to the P frame are not limited to have sizes between those of the I frame and those of the B frame. A person skilled in the art may perform configuration based on an actual service requirement. This is not limited in this embodiment.

Based on the foregoing descriptions, a plurality of modulation and coding schemes available for cyclic scheduling may also be configured by multiplexing an MCS field in DCI in the foregoing manner, in other words, different modulation and coding schemes may be used to process service frames that need to be processed at a scheduling periodicity, so that SPS resource scheduling can better match an XR service.

For the solution of multiplexing the TDRA field and the solution of multiplexing the MCS field, refer to the descriptions of multiplexing the FDRA to implement match between SPS resource scheduling and the XR service in the foregoing embodiments. Details are not described herein again.

Solution 2: Time-Frequency Resource Configuration for Downlink SPS

It can be learned from the descriptions of the foregoing embodiments that, in the cyclic configuration manner of SPS resources provided in the solution 1, SPS resources (time domain resources and/or frequency domain resources) corresponding to different SPS scheduling periodicities need to be separately configured for each UE. To simplify this procedure and ensure that a radio resource scheduled at each time for downlink SPS can still match a service frame of each scheduling periodicity, the solution 2 provides a manner combining a basic radio resource (determined by basic SPS resource configuration information) and a common radio resource (determined by common SPS resource configuration information). In this embodiment, a gNB may configure a plurality of types of common radio resources (of different sizes) based on service requirements, and configure basic radio resources of a same size for each SPS scheduling periodicity of a UE, so that common radio resources of different sizes are selected for the UE based on the basic radio resources for service frames of different sizes, to implement scheduling of radio resources of different sizes.

In other words, when SPS resource scheduling is performed at different scheduling periodicities for a UE, basic radio resources that can be used are the same, but common radio resources vary based on an actual service.

For example, in the solution 2, for the basic radio resource mentioned above, the gNB may configure RRC signaling, where the RRC signaling may include fixed frequency domain resource configuration information and time domain resource configuration information that are configured by using an FDRA field and a TDRA field. For example, in FIG. 9, all SPS resources corresponding to SPS have a frequency domain resource size of F3 and a time domain resource size of T1.

Further, based on the foregoing descriptions, a common time-frequency resource configuration pool (time domain resource configuration information and frequency domain resource configuration information) for selection by the UE also needs to be configured in the RRC signaling.

For example, the common time-frequency resource configuration pool (for example, may be named Sps-ResourceConfigCommon) may be shown, for example, in the following form: Sps-ResourceConfigCommon {{index 1, time domain configuration 1, frequency domain configuration 1}, {index 2, time domain configuration 2, frequency domain configuration 2}, {index 3, time domain configuration 3, frequency domain configuration 3}, . . . }.

It may be understood that the common time-frequency resource configuration pool may be configured with one or more pieces of common time-frequency resource configuration information (common radio resources) for selection by the UE.

In addition, it should be noted that, When the UE performs SPS resource scheduling at each scheduling periodicity, to determine whether a common radio resource needs to be used or which common radio resource needs to be used at this time, the UE specifically detects whether a demodulation reference signal (Demodulation Reference Signal, DMRS) corresponding to the current UE is carried in a common radio resource.

It may be understood that, usually, each UE has a DMRS identifying uniqueness of the UE, in other words, each UE corresponds to a different DMRS. Therefore, the UE may determine, by detecting whether there is the DMRS of the UE in the common radio resource, a radio resource specifically used in this time of SPS resource scheduling.

For example, during actual application, in addition to using a basic radio resource of a current scheduling periodicity, the UE further needs to detect whether there is the DMRS corresponding to the UE in one or more common radio resources corresponding to the current scheduling periodicity. If yes, it indicates that the common radio resource corresponding to the current scheduling periodicity needs to be used at this time. Otherwise, the common radio resource corresponding to the current scheduling periodicity is not used at this time.

In addition, it should be noted that, during actual application, only after the common radio resource is enabled, the UE can detect, at each scheduling periodicity, whether there is the DMRS of the UE in the common radio resource.

For example, a manner of enabling the common radio resource may be a manner of separately using RRC signaling, or a manner of agreeing on a bit in DCI.

The manner of separately using RRC signaling may be, for example, as follows: After RRC signaling including a configured basic radio resource and common radio resource is sent to UEs, for example, a UE 1, a UE 2, and a UE 3, if it is determined based on a service requirement that the UE 1 needs to additionally occupy a part of radio resources based on the basic radio resource when performing SPS resource scheduling, the gNB may separately send, to the UE 1 via RRC signaling, information for configuring an additional common radio resource, so that a common time-frequency resource (common radio resource) in a common time-frequency resource configuration pool stored in the UE 1 is enabled.

For example, for the manner of enabling the common time-frequency resource by separately using RRC signaling, information carried in the RRC signaling may be, for example, "sps-AdditionalResource ENUMERATED {true}", and therefore the common time-frequency resource is enabled.

For the manner of agreeing on a bit in the DCI, during actual application, for example, it may be agreed on that enabling is performed by using the first bit of the FDRA field in the DCI. For example, it is agreed on that "1" indicates "enabled", and "0" indicates "not enabled".

Further, after the common time-frequency resource is enabled, the UE 1 may detect whether there is a DMRS corresponding to the UE 1 on the common time-frequency resource.

Figure 9:
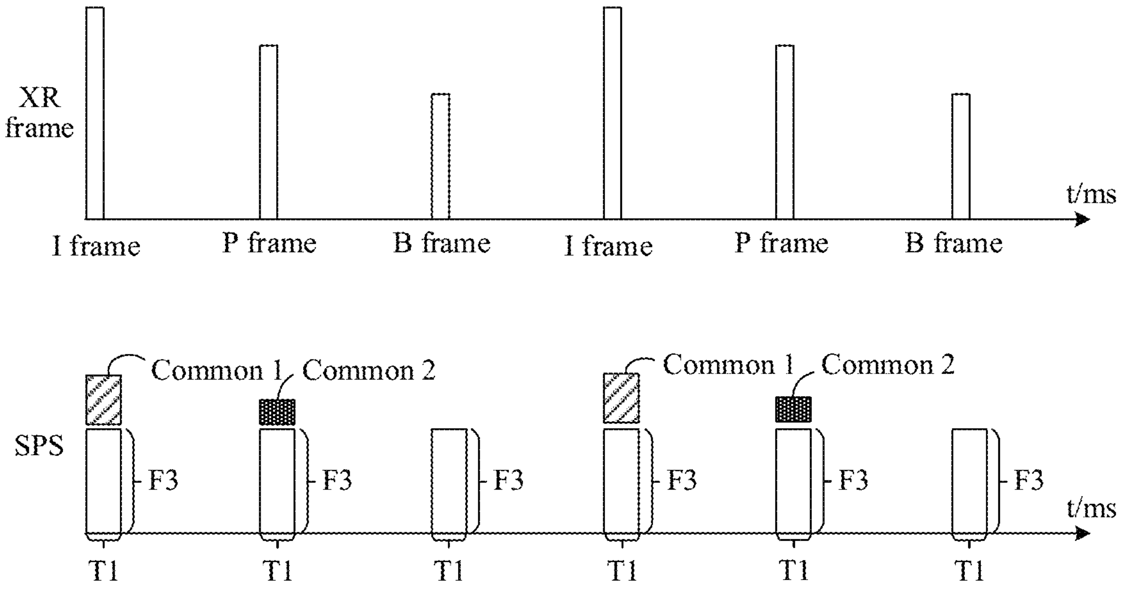
FIG. 9 is a fourth diagram of an example of match between an SPS time-frequency resource and an XR service frame.

For example, if a common time-frequency resource corresponding to an index 1 in Sps-ResourceConfigCommon is referred to as a common 1, a common time-frequency resource corresponding to an index 2 in Sps-ResourceConfigCommon is referred to as a common 2, and it is agreed on that the basic radio resource+the common 1 corresponds to an I frame, the basic radio resource+the common 2 corresponds to a P frame, the basic radio resource corresponds to a B frame, and the common 1 and the common 2 are enabled for the UE 1, radio resources corresponding to the UE 1 at each scheduling periodicity may be as shown in FIG. 9.

It should be noted that, "enabling" mentioned above specifically means that the gNB sends "sps-AdditionalResource ENUMERATED {true}" to the UE 1, and the UE 1 finds the DMRS of the UE 1 on the common 1 and the common 2. In this case, radio resources corresponding to the UE 1 at each scheduling periodicity are as shown in FIG. 9.

For example, in some implementations, sizes of commons corresponding to different indexes may be the same or different.

For example, in some other implementations, sizes of commons corresponding to different indexes may be in descending order as the indexes are in ascending order. For example, as shown in FIG. 9, a size of the common 1 is greater than a size of the common 2.

For example, in some other implementations, sizes of commons corresponding to different indexes may be set based on sizes of corresponding XR frames.

It should be understood that the foregoing descriptions are merely an example enumerated for better understanding of the technical solution in this embodiment, and are not used as a unique limitation on this embodiment.

Further, based on the foregoing implementations, it may be set that the gNB transmits only a low-priority data frame on the common radio resource. In this way, even if the UE does not successfully decode data on the common time-frequency resource due to missed detection of the DMRS corresponding to the UE or error code, impact on a processing result of a service is slight, and therefore stability of the service is ensured.

Further, to further simplify a processing procedure of the gNB, for example, for a scenario in which a plurality of UEs transmit a same data frame (for example, a plurality of users play games in a group, where each UE displays substantially the same image and therefore may transmit a same data frame), a common DMRS may be further defined to correspond to a common radio resource, and a common data frame is transmitted on the common radio resource. In this way, for service scenarios in which a UE needs to use a common radio resource, the gNB may add a common DMRS in a common radio resource for a common data frame that needs to be decoded by a plurality of UEs, and add a DMRS of a specific UE for a data frame that needs to be decoded by the UE. In this way, the UE decodes the common radio resource by using the common DMRS and the DMRS of the UE, to obtain, from the common radio resource, the common data frame sent by the gNB and the data frame sent by the gNB only to the UE.

In this way, in the technical solution provided in this embodiment, for downlink SPS, because the gNB may learn in advance which type of radio resource is required by which UE, the gNB configures a basic radio resource for each UE accessing the gNB, then configures one or more pieces of common time-frequency resources (common time-frequency domain resources) based on a service requirement, and dynamically enables the configured common time-frequency resource (common time-frequency domain resource) based on the service requirement, to allocate different radio resources to different UEs, and therefore satisfy diversified requirements of an XR service and match XR service frames corresponding to each scheduling periodicity.

Solution 3: Time-Frequency Resource Configuration for Uplink SPS (Uplink CG Type 1 and Uplink CG Type 2)

Figure 10:
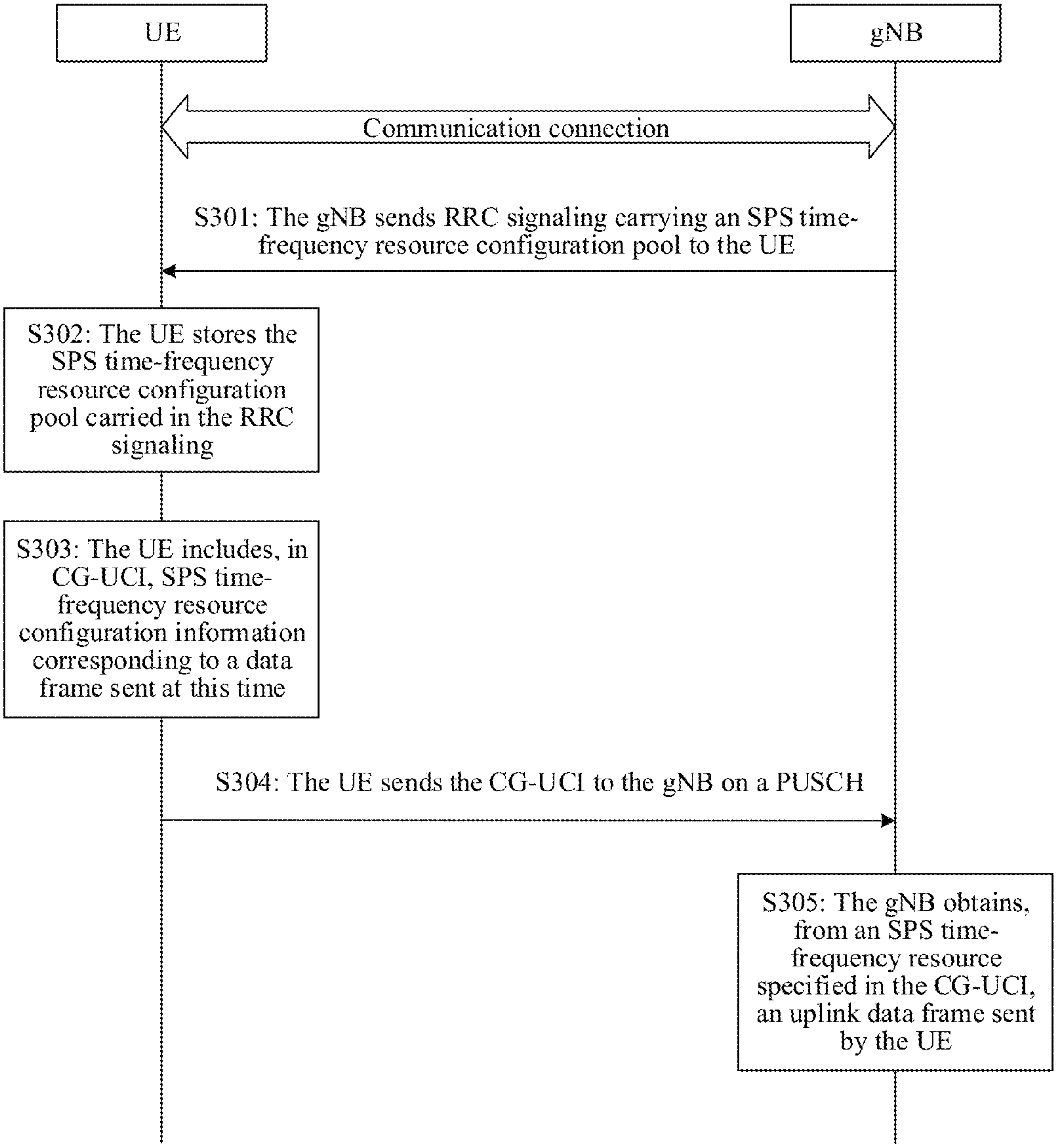
FIG. 10 is a third timing diagram of an example of setting an SPS time-frequency resource according to a semi-persistent scheduling method according to an embodiment of this application.

For example, with reference to FIG. 10, an implementation of the solution 3 may include the following steps.

S301: A gNB sends RRC signaling carrying an SPS time-frequency resource configuration pool to a UE.

It may be understood that the SPS time-frequency resource configuration pool mentioned above may include one or more pieces of time-frequency resource configuration information, each piece of time-frequency resource configuration information is identified by a different index, and time domain resource configuration information and frequency domain resource configuration information are both configured in each piece of time-frequency resource configuration information.

For example, time domain resource configuration information and frequency domain resource configuration information in time-frequency resource configuration information identified by each index may be the same or different. This is not limited in this embodiment.

For example, in some implementations, the SPS time-frequency resource configuration pool may be set, for example, in the following form: Sps-ResourceConfig {{index 1, time domain configuration 1, frequency domain configuration 1}, {index 2, time domain configuration 2, frequency domain configuration 2}, {index 3, time domain configuration 3, frequency domain configuration 3}, . . . }.

S302: The UE stores the SPS time-frequency resource configuration pool carried in the RRC signaling.

S303: The UE includes, in CG-UCI, SPS time-frequency resource configuration information corresponding to a data frame sent at this time.

It may be understood that the CG-UCI mentioned above is configured grant uplink control information (Configured grant Uplink Control Information), is included in a PUSCH when the UE sends the uplink data frame to the gNB on the PUSCH, and usually carries content shown in Table 4 in a current implementation scenario.

TABLE 4

Field information carried in existing CG-UCI

| Field | Bitwidth |
|---|---|
| HARQ process number | 4 |
| Redundancy version | 2 |
| New data indicator | 1 |
| . . . | . . . |

With reference to Table 4, "HARQ process number" represents a process number of a hybrid automatic repeat request, and "4" corresponding to "HARQ process number" indicates that "HARQ process number" occupies four bits; "Redundancy version" represents a redundancy version, and "2" corresponding to "Redundancy version" indicates that "Redundancy version" occupies two bits; and "New data indicator" represents a new transmission/retransmission data indicator, and "1" corresponding to "New data indicator" indicates that "New data indicator" occupies one bit.

It may be understood that other field information may be further recorded in the CG-UCI during actual application, and is not listed one by one herein. This is not limited in this embodiment either.

For example, to enable the UE to actively determine an SPS resource corresponding to the uplink data frame and notify the gNB of the SPS resource, to enable the gNB to obtain the uplink data frame from the specified SPS resource, in the technical solution provided in this embodiment, field information specifying an SPS time-frequency resource corresponding to the data frame sent at this time is added based on Table 4, and field information written in modified CG-UCI is, for example, as shown in Table 5.

TABLE 5

Field information carried in the CG-UCI of this embodiment (where an SPS resource config index field is added)

| Field | Bitwidth |
|---|---|
| HARQ process number | 4 |
| Redundancy version | 2 |
| New data indicator | 1 |
| . . . | . . . |
| SPS resource config index | 3 |

"SPS resource config index" represents an index number, in the SPS time-frequency resource configuration pool Sps-ResourceConfig, of the SPS time-frequency resource (SPS resource) corresponding to the uplink data frame sent at this time.

For example, Table 5 is used as an example, and "3" corresponding to "SPS resource config index" indicates that "SPS resource config index" occupies three bits. Based on this, when "SPS resource config index" occupies three bits, if a value (binary code corresponding to the three bits) of the "SPS resource config index" field is "011", it indicates that the UE uses time-frequency resource configuration information corresponding to an index 3 in Sps-ResourceConfig.

The example "Sps-ResourceConfig {{index 1, time domain configuration 1, frequency domain configuration 1}, {index 2, time domain configuration 2, frequency domain configuration 2}, {index 3, time domain configuration 3, frequency domain configuration 3}, . . . }" in S301 is used as an example, and a time domain resource size of the SPS resource specified by using the CG-UCI in Table 5 is the time domain configuration 3, and a frequency domain resource size is the frequency domain configuration 3.

It should be understood that the foregoing descriptions are merely an example enumerated for better understanding of the technical solution in this embodiment, and are not used as a unique limitation on this embodiment.

In addition, it should be noted that, in some implementations, the UE may separately specify, by using the CG-UCI, an index corresponding to a time domain configuration for transmitting the uplink data frame, and adjust a radio resource of uplink SPS scheduling by changing the time domain configuration, to better match the uplink data frame.

For example, for the manner of separately specifying the index corresponding to the time domain configuration for transmitting the uplink data frame, RRC signaling sent by the gNB to the UE needs to carry an SPS time domain resource configuration pool.

For example, the SPS time domain resource configuration pool may be shown, for example, in the following form: Sps-Tdraconfig {index 1, time domain configuration 1}, Sps-Tdraconfig {index 2, time domain configuration 2}, Sps-Tdraconfig {index 3, time domain configuration 3}, . . . .

A manner in which the UE separately specifies, based on the SPS time domain resource configuration pool by using the CG-UCI, the index corresponding to the time domain configuration for transmitting the uplink data frame may be shown, for example, with reference to Table 6.

TABLE 6

| Field information carried in the CG-UCI of this embodiment (where an SPS TDRA config index field is added) | |
|---|---|
| Field | Bitwidth |
| HARQ process number | 4 |
| Redundancy version | 2 |
| New data indicator | 1 |
| . . . | . . . |
| SPS TDRA config index | 3 |

"SPS TDRA config index" represents an index number, in the SPS time domain resource configuration pool Sps-Tdraconfig, of the time domain configuration corresponding to the uplink data frame sent at this time.

For example, Table 6 is used as an example, and "3" corresponding to "SPS TDRA config index" indicates that "SPS TDRA config index" occupies three bits. Based on this, when "SPS TDRA config index" occupies three bits, if a value (binary code corresponding to the three bits) of the "SPS TDRA config index" field is "010", it indicates that the UE uses time domain resource configuration information corresponding to an index 2 in Sps-Tdraconfig.

The example "Sps-Tdraconfig {index 1, time domain configuration 1}, Sps-Tdraconfig {index 2, time domain configuration 2}, Sps-Tdraconfig {index 3, time domain configuration 3}, . . . " is used as an example, and a time domain resource size of the SPS resource specified by using the CG-UCI in Table 6 is the time domain configuration 3.

It may be understood that, for this configuration manner, a frequency domain may be fixed and unchanged, to be specific, specified by using an FDRA in the RRC signaling.

In addition, it should be understood that the foregoing descriptions are merely an example enumerated for better understanding of the technical solution in this embodiment, and are not used as a unique limitation on this embodiment.

In addition, it should be noted that, in some other implementations, the UE may alternatively separately specify, by using the CG-UCI, an index corresponding to a frequency domain configuration for transmitting the uplink data frame, and adjust a radio resource of uplink SPS scheduling by changing the frequency domain configuration, to better match the uplink data frame.

For example, for the manner of separately specifying the index corresponding to the frequency domain configuration for transmitting the uplink data frame, RRC signaling sent by the gNB to the UE needs to carry an SPS frequency domain resource configuration pool.

For example, the SPS frequency domain resource configuration pool may be shown, for example, in the following form: Sps-Fdraconfig {index 1, frequency domain configuration 1}, Sps-Fdraconfig {index 2, frequency domain configuration 2}, Sps-Fdraconfig {index 3, frequency domain configuration 3}, Sps-Fdraconfig {index 4, frequency domain configuration 4}, . . . .

A manner in which the UE separately specifies, based on the SPS frequency domain resource configuration pool by using the CG-UCI, the index corresponding to the frequency domain configuration for transmitting the uplink data frame may be shown, for example, with reference to Table 7.

TABLE 7

| Field information carried in the CG-UCI of this embodiment (where an SPS FDRA config index field is added) | |
|---|---|
| Field | Bitwidth |
| HARQ process number | 4 |
| Redundancy version | 2 |
| New data indicator | 1 |
| . . . | . . . |
| SPS FDRA config index | 4 |

"SPS FDRA config index" represents an index number, in the SPS frequency domain resource configuration pool Sps-Fdraconfig, of the frequency domain configuration corresponding to the uplink data frame sent at this time.

For example, Table 7 is used as an example, and "4" corresponding to "SPS FDRA config index" indicates that "SPS FDRA config index" occupies four bits. Based on this, when "SPS FDRA config index" occupies four bits, if a value (binary code corresponding to the four bits) of the "SPS FDRA config index" field is "0001", it indicates that the UE uses frequency domain resource configuration information corresponding to an index 1 in Sps-Fdraconfig.

The example "Sps-Fdraconfig {index 1, frequency domain configuration 1}, Sps-Fdraconfig {index 2, frequency domain configuration 2}, Sps-Fdraconfig {index 3, frequency domain configuration 3}, Sps-Fdraconfig {index 4, frequency domain configuration 4}, . . . " is used as an example, and a frequency domain resource size of the SPS resource specified by using the CG-UCI in Table 7 is the frequency domain configuration 1.

It may be understood that, for this configuration manner, a time domain may be fixed and unchanged, to be specific, specified by using a TDRA in the RRC signaling.

In addition, it should be understood that the foregoing descriptions are merely an example enumerated for better understanding of the technical solution in this embodiment, and are not used as a unique limitation on this embodiment.

In addition, it should be noted that, in some implementations, the UE may separately specify, by using the CG-UCI, an index corresponding to a time domain configuration for transmitting the uplink data frame and an index corresponding to a frequency domain configuration for transmitting the uplink data frame, and adjust a radio resource of uplink SPS scheduling by changing the time domain configuration and the frequency domain configuration, to better match the uplink data frame.

For example, in the manner of specifying both the index corresponding to the time domain configuration for transmitting the uplink data frame and the index corresponding to the frequency domain configuration for transmitting the uplink data frame, the gNB may be set to send RRC signaling carrying an SPS time-frequency resource configuration pool to the UE in the manner corresponding to Table 5, or the gNB may be set to send RRC signaling carrying an SPS time domain resource configuration pool and an SPS frequency domain resource configuration pool.

For the latter, for example, the SPS time domain resource configuration pool may be shown, for example, in the following form: Sps-Tdraconfig {index 1, time domain configuration 1}, Sps-Tdraconfig {index 2, time domain configuration 2}, Sps-Tdraconfig {index 3, time domain configuration 3}, . . . .

The SPS frequency domain resource configuration pool may be shown, for example, in the following form: Sps-Fdraconfig {index 1, frequency domain configuration 1}, Sps-Fdraconfig {index 2, frequency domain configuration 2}, Sps-Fdraconfig {index 3, frequency domain configuration 3}, Sps-Fdraconfig {index 4, frequency domain configuration 4}, . . . .

A manner in which the UE separately specifies, based on the SPS time domain resource configuration pool and the SPS frequency domain resource configuration pool by using the CG-UCI, the index corresponding to the time domain configuration for transmitting the uplink data frame and the index corresponding to the frequency domain configuration for transmitting the uplink data frame may be shown, for example, with reference to Table 8.

TABLE 8

Field information carried in the CG-UCI of this embodiment (where an SPS TDRA config index field is added)

| Field | Bitwidth |
|---|---|
| HARQ process number | 4 |
| Redundancy version | 2 |
| New data indicator | 1 |
| . . . | . . . |
| SPS TDRA config index | 3 |
| SPS FDRA config index | 4 |

For example, the examples "Sps-Tdraconfig {index 1, time domain configuration 1}-Sps-Tdraconfig {index 2, time domain configuration 2}, Sps-Tdraconfig {index 3, time domain configuration 3}, . . . " and "Sps-Fdraconfig {index 1, frequency domain configuration 1}, Sps-Fdraconfig {index 2, frequency domain configuration 2}, Sps-Fdraconfig {index 3, frequency domain configuration 3}, Sps-Fdraconfig {index 4, frequency domain configuration 4}, . . . " are used as an example, and if a value (binary code corresponding to four bits) of the "SPS FDRA config index" field is "0001", it indicates that the UE uses frequency domain resource configuration information corresponding to the index 1 in Sps-Fdraconfig, and if a value (binary code corresponding to three bits) of the "SPS TDRA config index" field is "001", it indicates that the UE uses frequency domain resource configuration information corresponding to the index 1 in Sps-Tdraconfig, in other words, a time domain resource size of the SPS resource specified by using the CG-UCI in Table 8 is the time domain configuration 1, and a frequency domain resource size is the frequency domain configuration 1.

It should be understood that the foregoing descriptions are merely an example enumerated for better understanding of the technical solution in this embodiment, and are not used as a unique limitation on this embodiment.

S304: The UE sends the CG-UCI to the gNB on the PUSCH.

S305: The gNB obtains, from the SPS time-frequency resource specified in the CG-UCI, the uplink data frame sent by the UE.

In this way, in the technical solution provided in this embodiment, the gNB configures the SPS time-frequency resource configuration pool (the SPS time domain resource configuration pool and/or the SPS frequency domain resource configuration pool) to the UE, so that each time the UE sends an uplink data frame to the gNB, the UE can actively report an SPS resource corresponding to the uplink data frame of this time by including CG-UCI at each time, to enable the gNB to decode the uplink data frame based on the SPS resource specified in the CG-UCI when scheduling the uplink data frame sent by the UE at each time, and therefore implement match between a radio resource of uplink SPS and the uplink data frame.

Solution 4: Time-Frequency Resource (Radio Resource) Configuration for Downlink SPS It should be noted that, in an XR service scenario, a UE may usually determine a size of a downlink data frame based on behavior of a current user. For example, the UE may determine a size of a next downlink data frame (where the determined size of the next downlink data frame is referred to as prior information below) based on a viewing angle change range of the user.

For example, if the viewing angle change range is larger, related image content is larger, to be specific, a downlink data frame of a corresponding image is larger, and therefore an SPS resource matching the downlink data frame needs to be larger.

Figure 11:
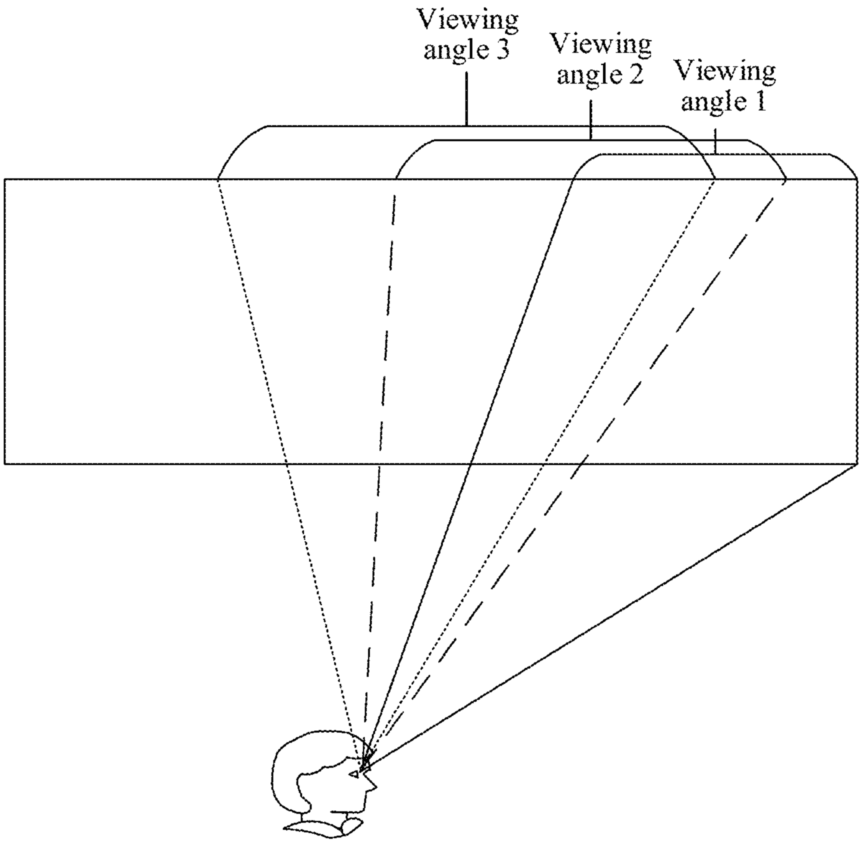
FIG. 11 is a diagram of an example of a user viewing angle change in an XR service scenario.

Based on this relationship, with reference to FIG. 11, a change range of a viewing angle 1 is smaller than a change range of a viewing angle 2, and the change range of the viewing angle 2 is smaller than a change range of a viewing angle 3. Therefore, in an actual application scenario, if the viewing angle change range of the user is substantially at the viewing angle 1 within a period of time, the determined size of the next downlink data frame is small. If the viewing angle change range of the user is substantially at the viewing angle 3 within a period of time, the determined size of the next downlink data frame is large. If the viewing angle change range of the user is substantially at the viewing angle 2 within a period of time, the determined size of the next downlink data frame is between a size of a downlink data frame corresponding to the viewing angle 1 and a size of a downlink data frame corresponding to the viewing angle 3.

For example, it is agreed on that an SPS resource that needs to be scheduled for the downlink data frame corresponding to the viewing angle 1 is a configuration 1, an SPS resource that needs to be scheduled for a downlink data frame corresponding to the viewing angle 2 is a configuration 2, and an SPS resource that needs to be scheduled for the downlink data frame corresponding to the viewing angle 3 is a configuration 3.

Based on this, configuration for a downlink SPS resource may be implemented, for example, in the following three manners.

Before the three manners of configuring a downlink SPS resource are described, objects involved in the three configuration manners are first described.

For example, in some implementation scenarios, the objects may be a client UE, a network-side gNB interacting with the UE, and an application server AF interacting with the gNB, where both the gNB and the AF access to a core network AMF.

Figure 12:
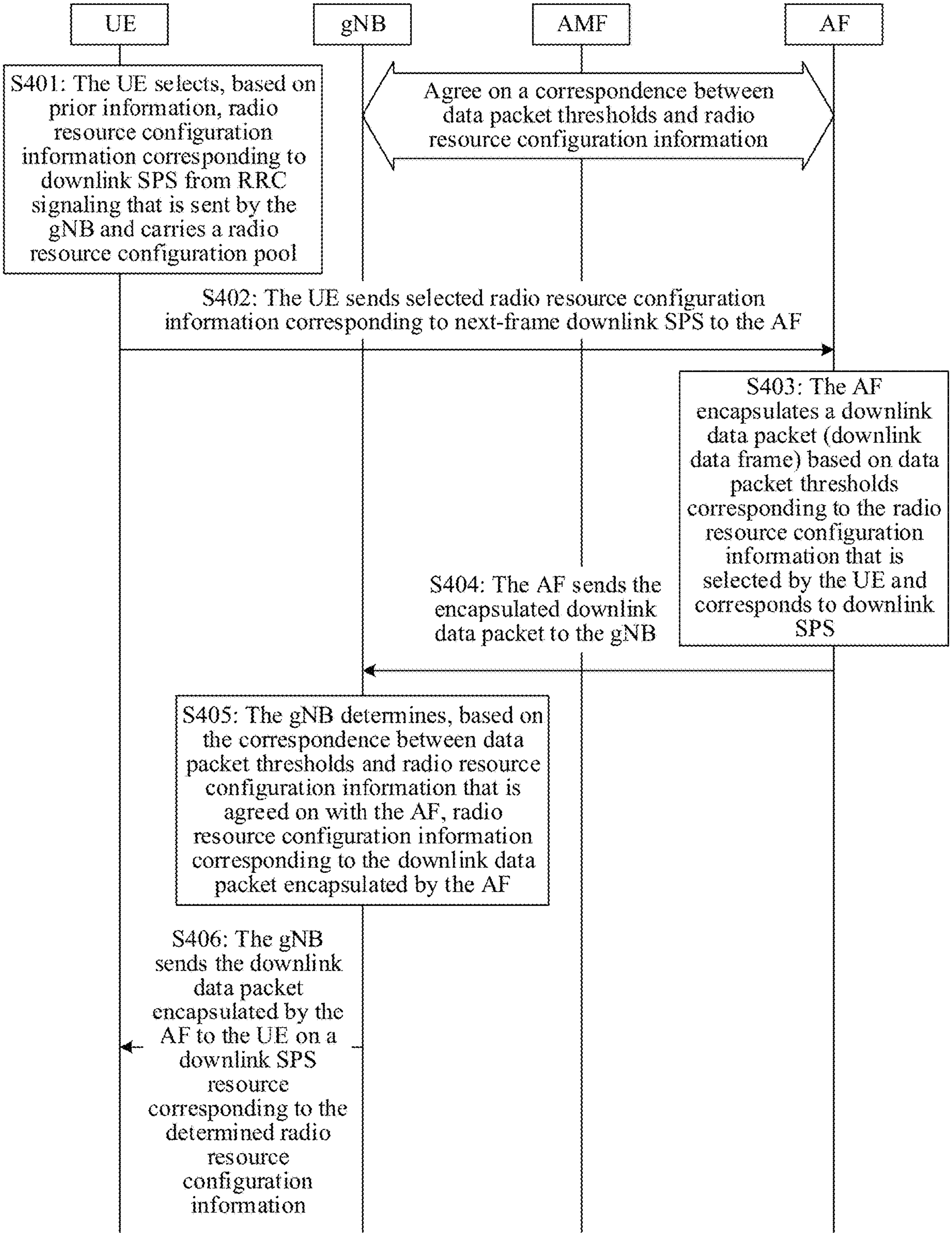
FIG. 12 is a fourth timing diagram of an example of setting an SPS time-frequency resource according to a semi-persistent scheduling method according to an embodiment of this application.

With reference to FIG. 12, a manner 1 of configuring a downlink SPS resource based on prior information includes the following steps.

S401: A UE selects, based on prior information, radio resource configuration information corresponding to downlink SPS from RRC signaling that is sent by a gNB and carries a radio resource configuration pool.

It may be understood that the RRC signaling carrying the radio resource configuration pool mentioned above may be obtained, for example, as follows: After the UE accesses the gNB, in other words, the UE and the gNB establish a communication connection, the gNB configures, based on service requirements of an XR service, a plurality of types of radio resources available for selection, for example, radio resource configuration information (referred to as a configuration 1 below) corresponding to a small data amount, radio resource configuration information (referred to as a configuration 3 below) corresponding to a large data amount, and radio resource configuration information (referred to as a configuration 2 below) corresponding to a data amount between the small data amount and the large data amount, and then sends RRC signaling carrying the radio resource configuration information to the UE via RRC signaling.

Correspondingly, after receiving the RRC signaling, the UE stores the RRC signaling locally; and when data needs to be transmitted with the gNB in an SPS manner, selects, from the RRC signaling based on estimated prior information, radio resource configuration information corresponding to the current prior information, namely, an estimated next downlink data frame, to determine a radio resource for subsequent downlink SPS scheduling.

S402: The UE sends selected radio resource configuration information corresponding to next-frame downlink SPS to an AF.

It may be understood that, during actual application, the UE needs to send the selected radio resource configuration information corresponding to downlink SPS to the AF through the gNB and an AMF. To be specific, the UE needs to first send the selected radio resource configuration information corresponding to downlink SPS to the gNB. Then, the gNB sends the selected radio resource configuration information corresponding to downlink SPS to the AMF. Finally, the AMF sends the selected radio resource configuration information corresponding to downlink SPS to the AF.

It should be noted that, in this embodiment, the radio resource configuration information that is selected by the UE and corresponds to next-frame downlink SPS is sent to the AF via application layer data, so that the gNB and the AMF only transparently transmit the data without parsing, and the gNB and the AMF cannot learn of the radio resource configuration information that is selected by the UE and corresponds to next-frame downlink SPS.

S403: The AF encapsulates a downlink data packet (downlink data frame) based on data packet thresholds corresponding to the radio resource configuration information that is selected by the UE and corresponds to downlink SPS.

For ease of description, in this embodiment, that radio resource configuration information is classified into the configuration 1 (small), the configuration 2 (medium), and the configuration 3 (large) as described above is used as an example, and the AF and the gNB and/or the AMF may agree on two data packet thresholds, for example, 500 KB and 1000 KB, in correspondence to the three types of radio resource configuration information.

Correspondingly, based on the two data packet thresholds, radio resource configuration information corresponding to a data packet of (0 KB, 500 KB) is the configuration 1; radio resource configuration information corresponding to a data packet of (500 KB, 1000 KB) is the configuration 2; and radio resource configuration information corresponding to a data packet of (1000 KB, ∞ KB) is the configuration 3.

In other words, based on the foregoing agreement, when the radio resource configuration information that is selected by the UE and corresponds to downlink SPS is the configuration 1, the downlink data packet encapsulated by the AF does not exceed 500 KB at maximum.

Correspondingly, when the radio resource configuration information that is selected by the UE and corresponds to downlink SPS is the configuration 2, the downlink data packet encapsulated by the AF does not exceed 1000 KB at maximum and is not less than 500 KB at minimum.

Correspondingly, when the radio resource configuration information that is selected by the UE and corresponds to downlink SPS is the configuration 3, the downlink data packet encapsulated by the AF is not less than 1000 KB at minimum.

It should be understood that the foregoing descriptions are merely an example enumerated for better understanding of the technical solution in this embodiment, and are not used as a unique limitation on this embodiment.

S404: The AF sends the encapsulated downlink data packet to the gNB.

It may be understood that, during actual application, the AF needs to send, to the gNB through the AMF, the downlink data packet encapsulated based on the data packet thresholds corresponding to the radio resource configuration information that is selected by the UE and corresponds to downlink SPS. To be specific, the AF needs to first send the encapsulated downlink data packet to the AMF. Then, the AMF sends the downlink data packet sent by the AF to the gNB.

S405: The gNB determines, based on a correspondence between data packet thresholds and radio resource configuration information that is agreed on with the AF, radio resource configuration information corresponding to the downlink data packet encapsulated by the AF.

The relationship between a threshold field data packet size and radio resource configuration information agreed on in the example of S403 is still used as an example, and if a size of the downlink data packet received by the gNB is between 500 KB and 1000 KB, radio resource configuration information of a radio resource of downlink SPS for transmitting the downlink data packet is determined as the configuration 2.

It should be understood that the foregoing descriptions are merely an example enumerated for better understanding of the technical solution in this embodiment, and are not used as a unique limitation on this embodiment. During actual application, the gNB may configure, based on diversified requirements of the XR service, a plurality of pieces of radio resource configuration information, and agree on with the AF a correspondence between a plurality of data packet thresholds and the radio resource configuration information, to implement better match between radio resources of downlink SPS scheduling and the XR service.

S406: The gNB sends the downlink data packet encapsulated by the AF to the UE on a downlink SPS resource corresponding to the determined radio resource configuration information.

In this way, in the technical solution provided in this embodiment, the gNB and the AF agree on the correspondence between data packet thresholds and radio resource configuration information in advance, and then the AF encapsulates the downlink data packet based on a size of the next downlink data frame (packet) estimated by the UE, to enable the gNB to determine, based on the agreed correspondence, the radio resource of downlink SPS that needs to be scheduled, to better adapt to the XR service.

Figure 13:
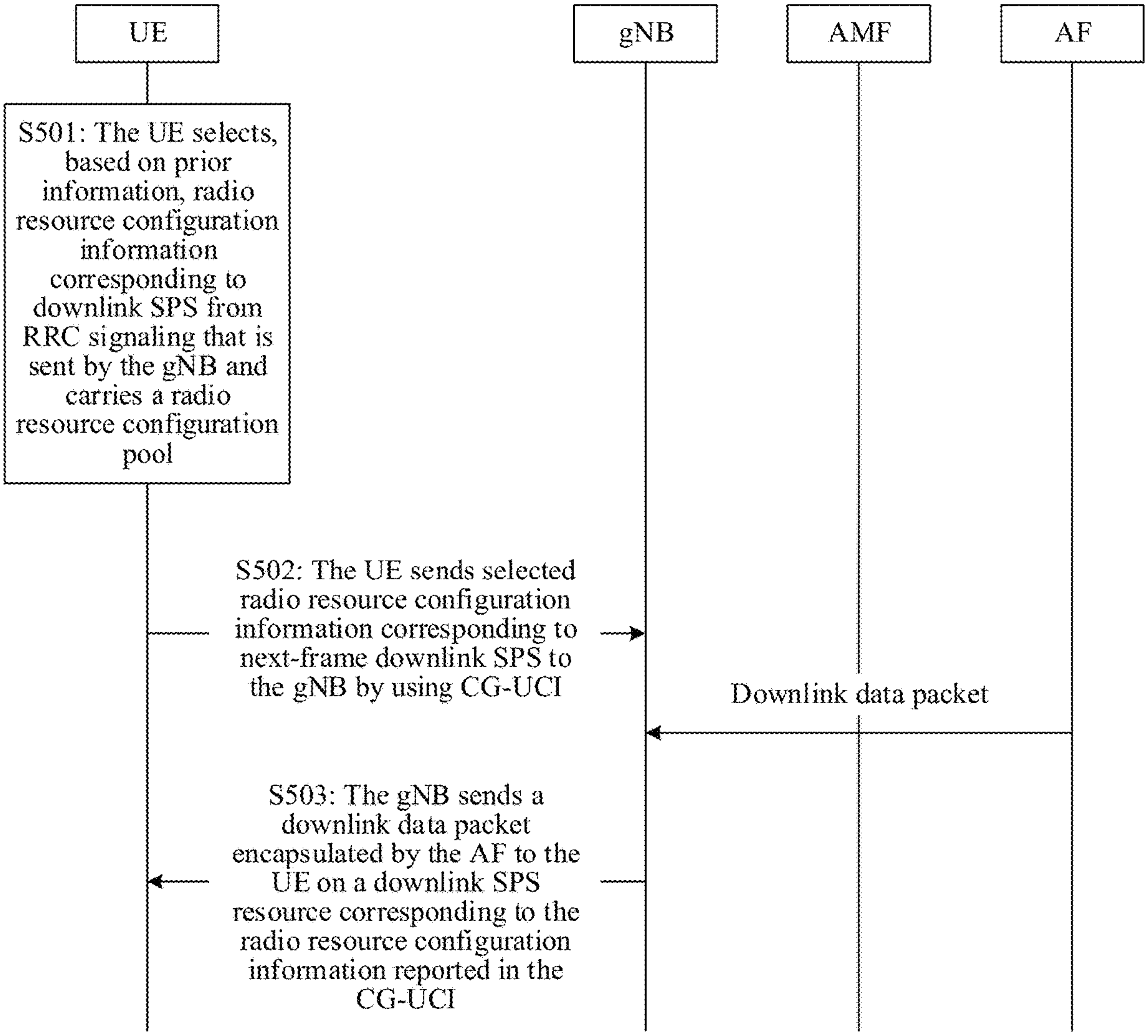
FIG. 13 is a fifth timing diagram of an example of setting an SPS time-frequency resource according to a semi-persistent scheduling method according to an embodiment of this application.

With reference to FIG. 13, a manner 2 of configuring a downlink SPS resource based on prior information includes the following steps.

S501: A UE selects, based on prior information, radio resource configuration information corresponding to downlink SPS from RRC signaling that is sent by a gNB and carries a radio resource configuration pool.

It may be understood that step S501 in this embodiment is substantially the same as step S401 in the foregoing embodiment. For specific implementation details, refer to the embodiment corresponding to FIG. 12. Details are not described herein again.

S502: The UE sends selected radio resource configuration information corresponding to next-frame downlink SPS to the gNB by using CG-UCI.

It may be understood that an operation of sending the selected radio resource configuration information corresponding to downlink SPS to the gNB by the UE by using the CG-UCI is substantially the same as the implementation shown in the solution 3. For specific implementation details, refer to the embodiment corresponding to FIG. 10. Details are not described herein again.

S503: The gNB sends a downlink data packet encapsulated by an AF to the UE on a downlink SPS resource corresponding to the radio resource configuration information reported in the CG-UCI.

In this way, in the technical solution provided in this embodiment, the UE reports required downlink SPS resource configuration information to the gNB based on prior information by using UCI/CG-UCI, and the gNB schedules a next data packet by using a configuration reported by the UE, so that after the reporting by the UE, only a reported downlink SPS resource is detected at a next periodicity, and therefore match between a downlink SPS resource and an XR service is implemented.

Figure 14:
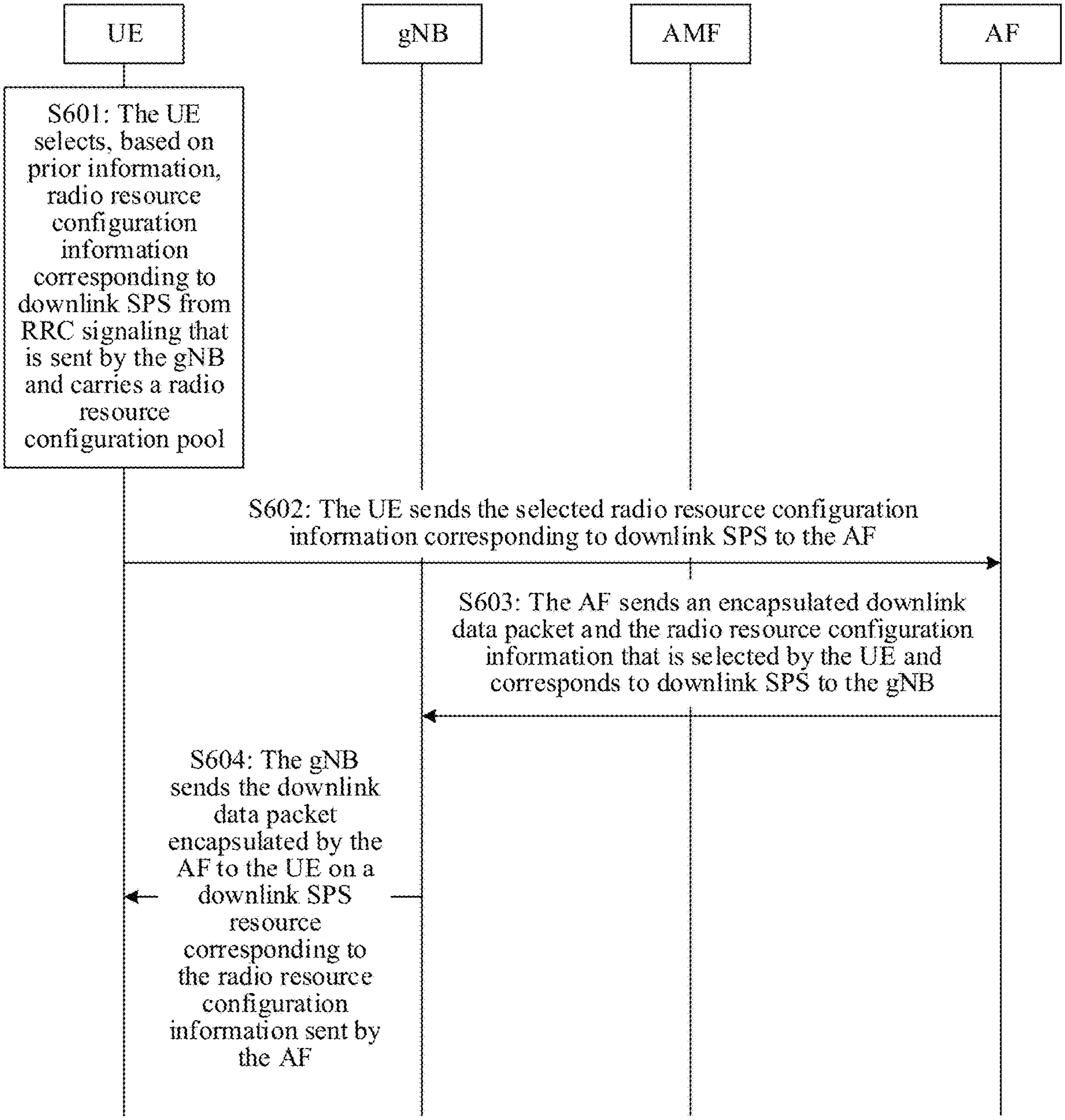
FIG. 14 is a sixth timing diagram of an example of setting an SPS time-frequency resource according to a semi-persistent scheduling method according to an embodiment of this application.

With reference to FIG. 14, a manner 3 of configuring a downlink SPS resource based on prior information includes the following steps.

S601: A UE selects, based on prior information, radio resource configuration information corresponding to downlink SPS from RRC signaling that is sent by a gNB and carries a radio resource configuration pool.

S602: The UE sends the selected radio resource configuration information corresponding to downlink SPS to an AF.

Step S601 and step S602 in this embodiment are substantially the same as step S401 and step S402 in the embodiment corresponding to FIG. 12. For specific implementation details, refer to the embodiment corresponding to FIG. 12. Details are not described herein again.

S603: The AF sends an encapsulated downlink data packet and the radio resource configuration information that is selected by the UE and corresponds to downlink SPS to the gNB.

For example, in this embodiment, the gNB and the AF do not need to agree on a correspondence between data packet thresholds and radio resource configuration information, and therefore do not need to encapsulate the downlink data packet based on the radio resource configuration information that is selected by the UE and corresponds to downlink SPS.

In addition, to enable the gNB to schedule the downlink data packet based on a downlink SPS resource corresponding to the radio resource configuration information that is selected by the UE and corresponds to downlink SPS, the AF may jointly or separately send the radio resource configuration information that is selected by the UE and corresponds to downlink SPS to the gNB when sending the downlink data packet to the gNB. This is not limited in this embodiment.

S604: The gNB sends the downlink data packet encapsulated by the AF to the UE on the downlink SPS resource corresponding to the radio resource configuration information sent by the AF.

In this way, in the technical solution provided in this embodiment, the AF further sends the radio resource configuration information that is selected by the UE and corresponds to downlink SPS in addition to sending the encapsulated downlink data packet to the gNB, so that the correspondence between data packet thresholds and radio resource configuration information does not need to be set between the gNB and the AF, a size of the downlink data packet encapsulated by the AF is not limited either, and only the radio resource configuration information that is selected by the UE and corresponds to downlink SPS is sent to the gNB, to enable the gNB to schedule a next data packet by using a configuration reported by the UE. In this way, after the reporting by the UE, only a reported downlink SPS resource is detected at a next periodicity, and therefore match between a downlink SPS resource and an XR service is implemented.

Figure 15:
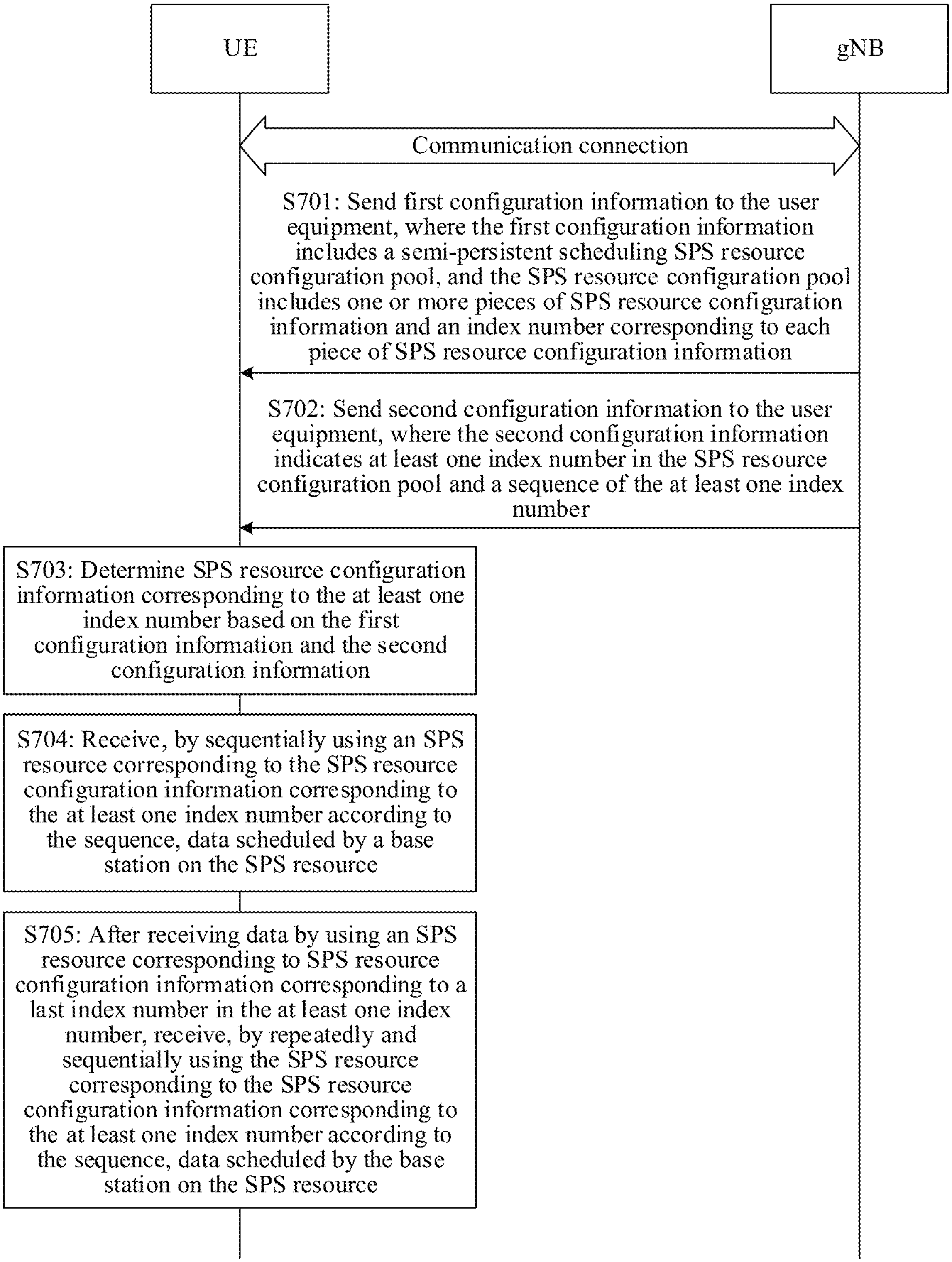
FIG. 15 is a first timing diagram of an example of a semi-persistent scheduling method according to an embodiment of this application.

In addition, it should be noted that, an implementation solution in the foregoing embodiments in which the base station sends only the SPS resource configuration pool (for example, the SPS frequency domain resource configuration pool/SPS time domain resource configuration pool/SPS modulation and coding scheme resource configuration pool/SPS time-frequency resource configuration pool) to the user equipment may be implemented according to a procedure shown in FIG. 15 during specific implementation.

For example, with reference to FIG. 15, a procedure in which a user equipment and a base station implement semi-persistent scheduling includes the following steps.

S701: Send first configuration information to the user equipment, where the first configuration information includes a semi-persistent scheduling SPS resource configuration pool, and the SPS resource configuration pool includes one or more pieces of SPS resource configuration information and an index number corresponding to each piece of SPS resource configuration information.

For example, after the base station sends the first configuration information to the user equipment, the user equipment receives the first configuration information from the base station.

In addition, it should be noted that, in this embodiment, the first configuration information is carried in radio resource control RRC signaling. In other words, the base station sends the first configuration information to the user equipment via the RRC signaling, and the user equipment may obtain the first configuration information through parsing from the received RRC signaling.

It may be understood that the SPS resource configuration pool included in the first configuration information mentioned in this embodiment may be, for example, the SPS frequency domain resource configuration pool mentioned in the embodiment corresponding to FIG. 4. For a specific form of the SPS frequency domain resource configuration pool, refer to the descriptions of the embodiment part corresponding to FIG. 4. Details are not described herein again.

S702: Send second configuration information to the user equipment, where the second configuration information indicates at least one index number in the SPS resource configuration pool and a sequence of the at least one index number.

For example, after the base station sends the second configuration information to the user equipment, the user equipment receives the second configuration information from the base station.

For example, the second configuration information is carried in downlink control information DCI.

For example, it can be learned from the descriptions of the foregoing embodiments that the SPS resource configuration information included in the SPS resource configuration pool may be, for example, an SPS frequency domain resource configuration pool, an SPS time domain resource configuration pool, or an SPS modulation and coding scheme resource configuration pool. For different SPS resource configuration information, the second configuration information is specifically carried in different fields in the DCI.

For example, when the SPS resource configuration information includes SPS frequency domain resource configuration information, the second configuration information is carried in a frequency domain resource assignment FDRA field in the DCI.

For example, when the SPS resource configuration information includes SPS time domain resource configuration information, the second configuration information is carried in a time domain resource assignment TDRA field in the DCI.

For example, when the SPS resource configuration information includes SPS modulation and coding scheme resource configuration information, the second configuration information is carried in a modulation and coding scheme MCS field in the DCI.

S703: Determine SPS resource configuration information corresponding to the at least one index number based on the first configuration information and the second configuration information.

Specifically, the SPS resource configuration information corresponding to the at least one index number is determined, based on the at least one index number that is in the SPS resource configuration pool and is indicated in the second configuration information, from the SPS resource configuration pool included in the first configuration information.

For example, content indicated by the second configuration information is an index 0 and an index 2 in the SPS resource configuration pool. In this case, the determined SPS resource configuration information is SPS resource configuration information (referred to as an SPS resource configuration 1 below) corresponding to the index 0 and SPS resource configuration information (referred to as an SPS resource configuration 2 below) corresponding to the index 2.

S704: Receive, by sequentially using an SPS resource corresponding to the SPS resource configuration information corresponding to the at least one index number according to the sequence, data scheduled by the base station on the SPS resource.

For example, the example shown in step S703 is still used for description, and when the sequence that is of the at least one index number and is indicated in the second configuration information is the index 0 and then the index 2, the user equipment receives, according to a sequence of an SPS resource (referred to as an SPS resource 1 below) corresponding to the SPS resource configuration 1 and an SPS resource (referred to as an SPS resource 2 below) corresponding to the SPS resource configuration 2, data scheduled by the base station on the SPS resources.

S705: After receiving data by using an SPS resource corresponding to SPS resource configuration information corresponding to a last index number in the at least one index number, receive, by repeatedly and sequentially using the SPS resource corresponding to the SPS resource configuration information corresponding to the at least one index number according to the sequence, data scheduled by the base station on the SPS resource.

For example, the example shown in step S704 is still used for description, and after receiving data by using the SPS resource 2, the user equipment receives, by repeatedly and sequentially using the SPS resource 1 corresponding to the SPS resource configuration 1 corresponding to the at least one index number according to the sequence, data scheduled by the base station on the SPS resources, in other words, receives, by cyclically using a sequence of the SPS resource 1, the SPS resource 2, the SPS resource 1, the SPS resource 2, . . . , the data scheduled by the base station on the SPS resources.

In this way, the user equipment can receive, by repeatedly using the SPS resource corresponding to the SPS resource configuration information corresponding to the at least one index number according to the sequence indicated by the second configuration information, the data scheduled by the base station on the SPS resource, so that an SPS resource matches a data frame of an XR service, and therefore power consumption of the user equipment is reduced and reduction of a system capacity of the base station can be avoided.

Descriptions of the manner of configuring a downlink SPS resource end here, and a manner of configuring an uplink SPS resource is described below based on the embodiment corresponding to FIG. 15.

For example, after receiving the first configuration information and the second configuration information that are sent by the base station, the user equipment sends third configuration information to the base station. The third configuration information indicates at least one index number in the SPS resource configuration pool and a sequence of the at least one index number.

Correspondingly, after sending the third configuration information to the base station, at each SPS scheduling periodicity, the user equipment sends data to the base station by sequentially using an SPS resource corresponding to SPS resource configuration information corresponding to the at least one index number according to the sequence indicated in the third configuration information.

For example, after the user equipment sends the third configuration information to the base station, the base station receives the third configuration information from the user equipment.

In addition, it should be noted that, in this embodiment, the third configuration information is carried in configured grant uplink control information CG-UCI.

It may be understood that the SPS resource configuration pool included in the third configuration information mentioned in this embodiment may be, for example, the SPS frequency domain resource configuration pool, the SPS time domain resource configuration pool, the SPS time-frequency resource configuration pool, or the SPS modulation and coding scheme resource configuration pool mentioned in the foregoing embodiments.

For example, in a scenario in which the SPS resource configuration pool is the SPS time-frequency resource configuration pool and the SPS resource configuration information is specifically SPS time-frequency resource configuration information, the third configuration information is carried in a time-frequency resource configuration field (for example, SPS resource config index in Table 5) in the CG-UCI.

For example, in a scenario in which the SPS resource configuration pool is the SPS time domain resource configuration pool and the SPS resource configuration information is specifically SPS time domain resource configuration information, the third configuration information is carried in a time domain resource assignment field (for example, SPS TDRA config index in Table 6) in the CG-UCI.

For example, in a scenario in which the SPS resource configuration pool is the SPS frequency domain resource configuration pool and the SPS resource configuration information is specifically SPS frequency domain resource configuration information, the third configuration information is carried in a frequency domain resource assignment field (for example, SPS FDRA config index in Table 7) in the CG-UCI.

It should be understood that the foregoing descriptions are merely an example enumerated for better understanding of the technical solution in this embodiment, and are not used as a unique limitation on this embodiment.

For example, in the scenario in which the user equipment sends the third configuration information to the base station, after receiving the third configuration information from the user equipment, the base station determines the SPS resource configuration information corresponding to the at least one index number based on the first configuration information and the third configuration information; then receives, by sequentially using the SPS resource corresponding to the SPS resource configuration information corresponding to the at least one index number according to the sequence, data scheduled by the user equipment on the SPS resource; and after receiving data by using an SPS resource corresponding to SPS resource configuration information corresponding to a last index number in the at least one index number, receives, by repeatedly and sequentially using the SPS resource corresponding to the SPS resource configuration information corresponding to the at least one index number according to the sequence, data scheduled by the user equipment on the SPS resource.

Figure 16:
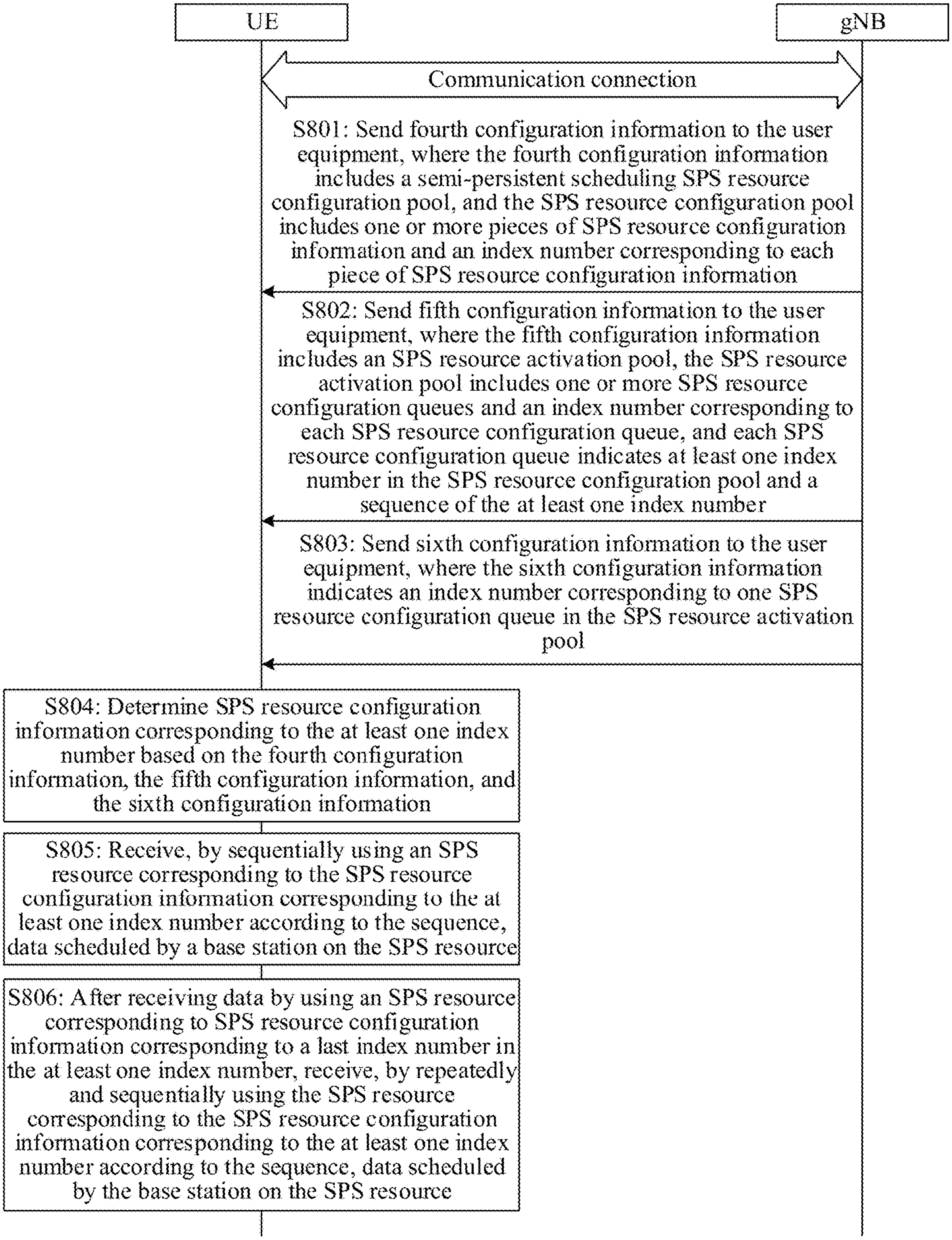
FIG. 16 is a second timing diagram of an example of a semi-persistent scheduling method according to an embodiment of this application.

In addition, it should be noted that, an implementation solution in the foregoing embodiments in which the base station sends both the SPS resource configuration pool (for example, the SPS frequency domain resource configuration pool/SPS time domain resource configuration pool/SPS modulation and coding scheme resource configuration pool/SPS time-frequency resource configuration pool) and the SPS resource activation pool (for example, the SPS frequency domain resource activation pool/SPS time domain resource activation pool/SPS modulation and coding scheme resource activation pool/SPS time-frequency resource activation pool) to the user equipment may be implemented according to a procedure shown in FIG. 16 during specific implementation.

For example, with reference to FIG. 16, a procedure in which a user equipment and a base station implement semi-persistent scheduling includes the following steps.

S801: Send fourth configuration information to the user equipment, where the fourth configuration information includes a semi-persistent scheduling SPS resource configuration pool, and the SPS resource configuration pool includes one or more pieces of SPS resource configuration information and an index number corresponding to each piece of SPS resource configuration information.

For example, after the base station sends the fourth configuration information to the user equipment, the user equipment receives the fourth configuration information from the base station.

In addition, it should be noted that, in this embodiment, the fourth configuration information is carried in radio resource control RRC signaling. In other words, the base station sends the fourth configuration information to the user equipment via the RRC signaling, and the user equipment may obtain the fourth configuration information through parsing from the received RRC signaling.

It may be understood that the SPS resource configuration pool included in the fourth configuration information mentioned in this embodiment may be, for example, the SPS frequency domain resource configuration pool mentioned in the embodiment corresponding to FIG. 4. For a specific form of the SPS frequency domain resource configuration pool, refer to the descriptions of the embodiment part corresponding to FIG. 4. Details are not described herein again.

S802: Send fifth configuration information to the user equipment, where the fifth configuration information includes an SPS resource activation pool, the SPS resource activation pool includes one or more SPS resource configuration queues and an index number corresponding to each SPS resource configuration queue, and each SPS resource configuration queue indicates at least one index number in the SPS resource configuration pool and a sequence of the at least one index number.

It should be noted that, to enable SPS resources corresponding to SPS resource configuration information configured for cyclic use to match diversified service scenarios, the base station further needs to send the fifth configuration information to the user equipment. The fifth configuration information includes the SPS resource activation pool, and the SPS resource activation pool includes the one or more SPS resource configuration queues and the index number corresponding to each SPS resource configuration queue. In addition, each SPS resource configuration queue indicates at least one index number in the SPS resource configuration pool and a sequence of the at least one index number.

For example, during actual application, the SPS resource activation pool included in the fifth configuration information is, for example, the SPS frequency domain resource activation pool mentioned in the embodiment corresponding to FIG. 6. For a specific form of the SPS frequency domain resource activation pool, refer to the descriptions of the embodiment part corresponding to FIG. 6. Details are not described herein again.

It may be understood that for the scenario in which the base station sends the fifth configuration information to the user equipment, the user equipment not only receives the fourth configuration information from the base station, but also receives the fifth configuration information from the base station.

For example, during actual application, the fifth configuration information may also be carried in RRC signaling. In other words, the base station sends the fifth configuration information to the user equipment via the RRC signaling, and the user equipment may obtain the fifth configuration information through parsing from the received RRC signaling.

It may be understood that, during actual application, the fourth configuration information and the fifth configuration information may be sent to the user equipment via same RRC signaling.

S803: Send sixth configuration information to the user equipment, where the sixth configuration information indicates an index number corresponding to one SPS resource configuration queue in the SPS resource activation pool.

For example, after the base station sends the sixth configuration information to the user equipment, the user equipment receives the sixth configuration information from the base station.

For example, the sixth configuration information is carried in downlink control information DCI.

For example, it can be learned from the descriptions of the foregoing embodiments that the SPS resource configuration information included in the SPS resource configuration pool may be, for example, an SPS frequency domain resource configuration pool, an SPS time domain resource configuration pool, or an SPS modulation and coding scheme resource configuration pool. For different SPS resource configuration information, the sixth configuration information is specifically carried in different fields in the DCI.

For example, when the SPS resource configuration information includes SPS frequency domain resource configuration information, the sixth configuration information is carried in a frequency domain resource assignment FDRA field in the DCI.

For example, when the SPS resource configuration information includes SPS time domain resource configuration information, the sixth configuration information is carried in a time domain resource assignment TDRA field in the DCI.

For example, when the SPS resource configuration information includes SPS modulation and coding scheme resource configuration information, the sixth configuration information is carried in a modulation and coding scheme MCS field in the DCI.

S804: Determine SPS resource configuration information corresponding to the at least one index number based on the fourth configuration information, the fifth configuration information, and the sixth configuration information.

It may be understood that, in some implementations, a manner in which the base station determines the SPS resource configuration information corresponding to the at least one index number based on the fourth configuration information, the fifth configuration information, and the sixth configuration information may be, for example, as follows: first determining, based on the fifth configuration information and the sixth configuration information, the SPS resource configuration queue that is in the SPS resource activation pool and corresponds to the index number indicated by the sixth configuration information; and then determining the SPS resource configuration information corresponding to the at least one index number based on the fourth configuration information and the determined SPS resource configuration queue.

S805: Receive, by sequentially using an SPS resource corresponding to the SPS resource configuration information corresponding to the at least one index number according to the sequence, data scheduled by the base station on the SPS resource.

S806: After receiving data by using an SPS resource corresponding to SPS resource configuration information corresponding to a last index number in the at least one index number, receive, by repeatedly and sequentially using the SPS resource corresponding to the SPS resource configuration information corresponding to the at least one index number according to the sequence, data scheduled by the base station on the SPS resource.

For implementation of step S805 and step S806, refer to the descriptions of step S704 and step S705 in the embodiment corresponding to FIG. 15. Details are not described herein again.

In this way, through introduction of the SPS resource activation pool, at least one index number and a sequence of the at least one index number in the SPS resource configuration pool are configured into an SPS resource configuration queue in the SPS resource activation pool, so that the at least one index number and the sequence of the at least one index number in the SPS resource configuration pool can be determined based on an index number of the SPS resource configuration queue. Therefore, this is applicable to more service scenarios.

In addition, when the user equipment receives both the fourth configuration information and the fifth configuration information, content indicated by the sixth configuration information sent by the base station may be an index number corresponding to one SPS resource configuration queue in the SPS resource activation pool, so that cyclic use at more SPS periodicities can be implemented by using a same field. Therefore, this is applicable to more service scenarios.

Descriptions of the manner of configuring a downlink SPS resource end here, and a manner of configuring an uplink SPS resource is described below based on the embodiment corresponding to FIG. 16.

For example, after receiving the fourth configuration information, the fifth configuration information, and the sixth configuration information that are sent by the base station, the user equipment sends seventh configuration information to the base station. The seventh configuration information indicates at least one index number in the SPS resource configuration pool and a sequence of the at least one index number.

Correspondingly, after sending the seventh configuration information to the base station, at each SPS scheduling periodicity, the user equipment sends data to the base station by sequentially using an SPS resource corresponding to SPS resource configuration information corresponding to the at least one index number according to the sequence indicated in the seventh configuration information.

For example, after the user equipment sends the seventh configuration information to the base station, the base station receives the seventh configuration information from the user equipment.

In addition, it should be noted that, in this embodiment, the seventh configuration information is carried in configured grant uplink control information CG-UCI.

It may be understood that the SPS resource configuration pool included in the seventh configuration information mentioned in this embodiment may be, for example, the SPS frequency domain resource configuration pool, the SPS time domain resource configuration pool, the SPS time-frequency resource configuration pool, or the SPS modulation and coding scheme resource configuration pool mentioned in the foregoing embodiments.

For example, in a scenario in which the SPS resource configuration pool is the SPS time-frequency resource configuration pool and the SPS resource configuration information is specifically SPS time-frequency resource configuration information, the seventh configuration information is carried in a time-frequency resource configuration field (for example, SPS resource config index in Table 5) in the CG-UCI.

For example, in a scenario in which the SPS resource configuration pool is the SPS time domain resource configuration pool and the SPS resource configuration information is specifically SPS time domain resource configuration information, the seventh configuration information is carried in a time domain resource assignment field (for example, SPS TDRA config index in Table 6) in the CG-UCI.

For example, in a scenario in which the SPS resource configuration pool is the SPS frequency domain resource configuration pool and the SPS resource configuration information is specifically SPS frequency domain resource configuration information, the seventh configuration information is carried in a frequency domain resource assignment field (for example, SPS FDRA config index in Table 7) in the CG-UCI.

It should be understood that the foregoing descriptions are merely an example enumerated for better understanding of the technical solution in this embodiment, and are not used as a unique limitation on this embodiment.

For example, in the scenario in which the user equipment sends the seventh configuration information to the base station, after receiving the seventh configuration information from the user equipment, the base station determines the SPS resource configuration information corresponding to the at least one index number based on the first configuration information and the third configuration information; then receives, by sequentially using the SPS resource corresponding to the SPS resource configuration information corresponding to the at least one index number according to the sequence, data scheduled by the user equipment on the SPS resource; and after receiving data by using an SPS resource corresponding to SPS resource configuration information corresponding to a last index number in the at least one index number, receives, by repeatedly and sequentially using the SPS resource corresponding to the SPS resource configuration information corresponding to the at least one index number according to the sequence, data scheduled by the user equipment on the SPS resource.

In addition, it should be noted that, to enable the embodiment corresponding to FIG. 15 and the embodiment corresponding to FIG. 16 to be applicable to a scenario of basic radio resource+common radio resource, the SPS resource configuration pool may further include common SPS resource configuration information.

For example, the common SPS resource configuration information includes at least one piece of or a plurality of pieces of SPS time-frequency resource configuration information, each piece of SPS time-frequency resource configuration information includes SPS time domain resource configuration information and SPS frequency domain resource configuration information, and the SPS time domain resource configuration information and the SPS frequency domain resource configuration information correspond to a same index number, in other words, the SPS time domain resource configuration information and the SPS frequency domain resource configuration information may be simultaneously configured by using one index number.

It may be understood that, for a scenario in which the common SPS resource configuration information exists, to enable the user equipment to detect, at each SPS scheduling periodicity, whether there is a demodulation reference signal DMRS of the user equipment in an SPS resource corresponding to the common SPS resource configuration information, to determine whether to receive data scheduled by the base station on the SPS resource corresponding to the common SPS resource configuration information, the base station further sends enabling information to the user equipment.

For example, the enabling information mentioned in this embodiment indicates the user equipment to detect, at each SPS scheduling periodicity, whether there is the demodulation reference signal DMRS of the user equipment in the SPS resource corresponding to the common SPS resource configuration information.

For example, for the base station, after sending the enabling information to the user equipment, if the base station expects a user equipment A to receive, from an SPS resource corresponding to common SPS resource configuration information 1, data scheduled by the base station on the SPS resource corresponding to the common SPS resource configuration information, the base station includes a DMRS of the user equipment A in the SPS resource corresponding to the common SPS resource configuration information 1.

Correspondingly, after the base station sends the enabling information to the user equipment, the user equipment receives the enabling information, so that at each SPS scheduling periodicity, the user equipment detects whether there is the DMRS of the user equipment in the SPS resource corresponding to the common SPS resource configuration information.

Correspondingly, if the DMRS of the user equipment is found in the SPS resource corresponding to the common SPS resource configuration information at each SPS scheduling periodicity, the user equipment receives the data scheduled by the base station on the SPS resource corresponding to the common SPS resource configuration information. For example, if the user equipment A finds the DMRS of the user equipment A in the common SPS resource configuration information 1 at an SPS scheduling periodicity, the user equipment A receives the data scheduled by the base station on the SPS resource corresponding to the common SPS resource configuration information 1.

In this way, through introduction of the common SPS resource configuration information, SPS resources corresponding to common SPS resource configuration information of different sizes can be selected based on SPS resources corresponding to SPS resource configuration information, to further implement scheduling of SPS resources of different sizes, and better adapt to diversified requirements for radio resources of a service having a feature of periodicity.

The foregoing descriptions of the implementations allow a person skilled in the art to clearly understand that, for the purpose of convenient and brief description, division into the functional modules is merely used as an example for description. During actual application, the foregoing functions may be allocated to different functional modules for implementation as required. In other words, an inner structure of the apparatus is divided into different functional modules to implement all or some of the functions described above. For a detailed working process of the foregoing system, apparatus, and unit, refer to a corresponding process in the foregoing method embodiments. Details are not described herein again.

In several embodiments provided in embodiments, it should be understood that the disclosed system, apparatus, and method may be implemented in other manners. For example, the described apparatus embodiments are merely examples. For example, division into the modules or units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one position, or may be distributed on a plurality of network units. Some or all of the units may be selected based on actual requirements to achieve the objectives of the solutions of embodiments.

In addition, functional units in embodiments may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in embodiments essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in embodiments. The foregoing storage medium includes any medium that can store program code, for example, a flash memory, a removable hard disk, a read-only memory, a random access memory, a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A semi-persistent scheduling method, wherein the method is applied to a user equipment, and comprises:

receiving first configuration information from a base station, wherein the first configuration information comprises a semi-persistent scheduling SPS resource configuration pool, and the SPS resource configuration pool comprises one or more pieces of SPS resource configuration information and an index number corresponding to each piece of SPS resource configuration information;

receiving second configuration information from the base station, wherein the second configuration information indicates at least one index number in the SPS resource configuration pool and a sequence of the at least one index number;

determining SPS resource configuration information corresponding to the at least one index number based on the first configuration information and the second configuration information;

receiving, by sequentially using an SPS resource corresponding to the SPS resource configuration information corresponding to the at least one index number according to the sequence, data scheduled by the base station on the SPS resource; and after receiving data by using an SPS resource corresponding to SPS resource configuration information corresponding to a last index number in the at least one index number, receiving, by repeatedly and sequentially using the SPS resource corresponding to the SPS resource configuration information corresponding to the at least one index number according to the sequence, data scheduled by the base station on the SPS resource.

2. The method according to claim 1, wherein the second configuration information is carried in downlink control information DCI.

3. The method according to claim 2, wherein the SPS resource configuration information comprises SPS frequency domain resource configuration information; and the second configuration information is carried in a frequency domain resource assignment FDRA field in the DCI.

4. The method according to claim 2, wherein the SPS resource configuration information comprises SPS time domain resource configuration information; and the second configuration information is carried in a time domain resource assignment TDRA field in the DCI.

5. The method according to claim 2, wherein the SPS resource configuration information comprises SPS modulation and coding scheme resource configuration information; and the second configuration information is carried in a modulation and coding scheme MCS field in the DCI.

6. The method according to claims 1, wherein the SPS resource configuration pool further comprises common SPS resource configuration information; and the common SPS resource configuration information comprises at least one piece of or a plurality of pieces of SPS time-frequency resource configuration information.

7. The method according to claim 6, wherein the method further comprises:

receiving enabling information from the base station, wherein the enabling information indicates the user equipment to detect, at each SPS scheduling periodicity, whether there is a demodulation reference signal DMRS of the user equipment in an SPS resource corresponding to the common SPS resource configuration information.

8. The method according to claim 7, wherein after the receiving enabling information from the base station, the method further comprises:

detecting, at each SPS scheduling periodicity, whether there is the DMRS of the user equipment in the SPS resource corresponding to the common SPS resource configuration information; and when finding, at each SPS scheduling periodicity, that there is the DMRS of the user equipment in the SPS resource corresponding to the common SPS resource configuration information, receiving data scheduled by the base station on the SPS resource corresponding to the common SPS resource configuration information.

9. The method according to claims 1, wherein the method further comprises:

sending third configuration information to the base station, wherein the third configuration information indicates at least one index number in the SPS resource configuration pool and a sequence of the at least one index number; and sending data to the base station by sequentially using an SPS resource corresponding to SPS resource configuration information corresponding to the at least one index number according to the sequence.

10. The method according to claim 9, wherein the third configuration information is carried in configured grant uplink control information CG-UCI.

11. The method according to claim 10, wherein when the SPS resource configuration information comprises the SPS frequency domain resource configuration information, the third configuration information is carried in a frequency domain resource assignment field in the CG-UCI; or when the SPS resource configuration information comprises the SPS time domain resource configuration information, the third configuration information is carried in a time domain resource assignment field in the CG-UCI; or when the SPS resource configuration information comprises the SPS modulation and coding scheme resource configuration information, the third configuration information is carried in a modulation configuration coding field in the CG-UCI; or when the SPS resource configuration information comprises the SPS time-frequency resource configuration information, the third configuration information is carried in a time-frequency resource configuration field in the CG-UCI.

12. A semi-persistent scheduling method, wherein the method is applied to a base station, and comprises:

sending first configuration information to a user equipment, wherein the first configuration information comprises a semi-persistent scheduling SPS resource configuration pool, and the SPS resource configuration pool comprises one or more pieces of SPS resource configuration information and an index number corresponding to each piece of SPS resource configuration information; and sending second configuration information to the user equipment, wherein the second configuration information indicates at least one index number in the SPS resource configuration pool and a sequence of the at least one index number.

13. The method according to claim 12, wherein the SPS resource configuration pool further comprises common SPS resource configuration information; and the common SPS resource configuration information comprises at least one piece of or a plurality of pieces of SPS time-frequency resource configuration information.

14. The method according to claim 13, wherein the method further comprises:

sending enabling information to the user equipment, wherein the enabling information indicates the user equipment to detect, at each SPS scheduling periodicity, whether there is a demodulation reference signal DMRS of the user equipment in an SPS resource corresponding to the common SPS resource configuration information.

15. The method according to claim 12, wherein the method further comprises:

receiving third configuration information from the user equipment, wherein the third configuration information indicates at least one index number in the SPS resource configuration pool and a sequence of the at least one index number;

determining SPS resource configuration information corresponding to the at least one index number based on the first configuration information and the third configuration information;

receiving, by sequentially using an SPS resource corresponding to the SPS resource configuration information corresponding to the at least one index number according to the sequence, data scheduled by the user equipment on the SPS resource; and after receiving data by using an SPS resource corresponding to SPS resource configuration information corresponding to a last index number in the at least one index number, receiving, by repeatedly and sequentially using the SPS resource corresponding to the SPS resource configuration information corresponding to the at least one index number according to the sequence, data scheduled by the user equipment on the SPS resource.

16. A semi-persistent scheduling method, wherein the method is applied to a user equipment, and comprises:

receiving fourth configuration information from a base station, wherein the fourth configuration information comprises a semi-persistent scheduling SPS resource configuration pool, and the SPS resource configuration pool comprises one or more pieces of SPS resource configuration information and an index number corresponding to each piece of SPS resource configuration information;

receiving fifth configuration information from the base station, wherein the fifth configuration information comprises an SPS resource activation pool, the SPS resource activation pool comprises one or more SPS resource configuration queues and an index number corresponding to each SPS resource configuration queue, and each SPS resource configuration queue indicates at least one index number in the SPS resource configuration pool and a sequence of the at least one index number;

receiving sixth configuration information from the base station, wherein the sixth configuration information indicates an index number corresponding to one SPS resource configuration queue in the SPS resource activation pool;

determining SPS resource configuration information corresponding to the at least one index number based on the fourth configuration information, the fifth configuration information, and the sixth configuration information;

receiving, by sequentially using an SPS resource corresponding to the SPS resource configuration information corresponding to the at least one index number according to the sequence, data scheduled by the base station on the SPS resource; and after receiving data by using an SPS resource corresponding to SPS resource configuration information corresponding to a last index number in the at least one index number, receiving, by repeatedly and sequentially using the SPS resource corresponding to the SPS resource configuration information corresponding to the at least one index number according to the sequence, data scheduled by the base station on the SPS resource.

17. The method according to claim 16, wherein the determining SPS resource configuration information corresponding to the at least one index number based on the fourth configuration information, the fifth configuration information, and the sixth configuration information comprises:

determining, based on the fifth configuration information and the sixth configuration information, the SPS resource configuration queue that is in the SPS resource activation pool and corresponds to the index number indicated by the sixth configuration information; and determining the SPS resource configuration information corresponding to the at least one index number based on the fourth configuration information and the determined SPS resource configuration queue.

* * * * *